United States Patent
De Paiva et al.

(10) Patent No.: US 12,105,533 B1
(45) Date of Patent: Oct. 1, 2024

(54) POWERED LIFT ENABLE AND DISABLE SWITCH

(71) Applicant: Archer Aviation Inc., San Jose, CA (US)

(72) Inventors: Fernanda Aline Matta De Paiva, Los Altos Hills, CA (US); Geoffrey Christien Bower, Sunnyvale, CA (US); Nathan Thomas Depenbusch, Mountain View, CA (US); Ricardo Augusto Marques, San Jose, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/401,450

(22) Filed: Dec. 30, 2023

Related U.S. Application Data

(60) Provisional application No. 63/500,706, filed on May 8, 2023.

(51) Int. Cl.
  *B64D 43/00*  (2006.01)
  *G05D 1/60*   (2024.01)
  *G05D 1/82*   (2024.01)
  *G05D 109/22* (2024.01)

(52) U.S. Cl.
  CPC ............. *G05D 1/60* (2024.01); *B64D 43/00* (2013.01); *G05D 1/82* (2024.01); *G05D 2109/24* (2024.01)

(58) Field of Classification Search
  CPC ............. H01H 36/0006; H01H 36/006; H01H 2239/03
  See application file for complete search history.

(56) References Cited

U.S. PATENT DOCUMENTS

| | | | | |
|---|---|---|---|---|
| 4,682,746 A | * | 7/1987 | Thomas ............ | B64C 5/06 244/91 |
| 4,829,441 A | * | 5/1989 | Mandle ............. | G01P 7/00 702/144 |
| 8,322,655 B1 | * | 12/2012 | Kismarton ........ | B64C 5/02 244/119 |

(Continued)

OTHER PUBLICATIONS

Liu et al., Development of power drive technology for high lift system of commercial aircraft, 2020, IEEE, p. 1-5 (Year: 2020).*

(Continued)

*Primary Examiner* — McDieunel Marc
(74) *Attorney, Agent, or Firm* — Finnegan, Henderson, Farabow, Garret & Dunner, LLP

(57) ABSTRACT

A control system for a powered lift aircraft includes a pilot input device, at least one powered lift element configured to provide powered lift support to the aircraft, and a processor. The processor is configured to receive, from the pilot input device, an input indicative of one of a powered lift enabled mode or a powered lift disabled mode and control the at least one powered lift element to operate the aircraft in a selected one of the powered lift enabled mode or the powered lift disabled mode based on the received input. When the aircraft is in the powered lift enabled mode, the at least one processor is configured to control the at least one powered lift element based on a state of the aircraft. When the aircraft is in the powered lift disabled mode, the at least one processor is configured to control the at least one powered lift element to disable powered lift.

34 Claims, 13 Drawing Sheets

(56) References Cited

U.S. PATENT DOCUMENTS

| | | | | |
|---|---|---|---|---|
| 8,403,256 | B1* | 3/2013 | Gregg, III | B64C 9/38 |
| | | | | 244/119 |
| 9,891,632 | B1* | 2/2018 | Irwin | G05D 1/0676 |
| 11,148,801 | B2* | 10/2021 | Evulet | B64C 3/10 |
| 11,417,154 | B1* | 8/2022 | Moeykens | G06F 21/32 |
| 2002/0047071 | A1* | 4/2002 | Illingworth | F15D 1/00 |
| | | | | 244/199.1 |
| 2002/0193920 | A1* | 12/2002 | Miller | G06Q 50/40 |
| | | | | 701/9 |
| 2020/0118449 | A1* | 4/2020 | Rose | G01S 13/882 |
| 2021/0016872 | A1* | 1/2021 | Inokuchi | G01P 5/26 |
| 2022/0365224 | A1* | 11/2022 | Rose | G08G 5/0021 |
| 2023/0054436 | A1 | 2/2023 | Auerbach et al. | |
| 2023/0359197 | A1* | 11/2023 | Rose | G06V 10/245 |

OTHER PUBLICATIONS

Zhi-hua et al., Influence of the Landing Gear Casing on a High Lift Aircraft, 2018, IEEE, p. 157—(Year: 2018).*

Müller et al., Power electronics design for a direct-driven turbo compressor used as advanced high-lift system in future aircraft, 2017, IEEE, p. 4397-4402 (Year: 2017).*

Martynov et al., Real-time control of aircraft take-off in windshear. Part I: Aircraft model and control schemes, 2017, IEEE, p. 277— (Year: 2017).*

* cited by examiner

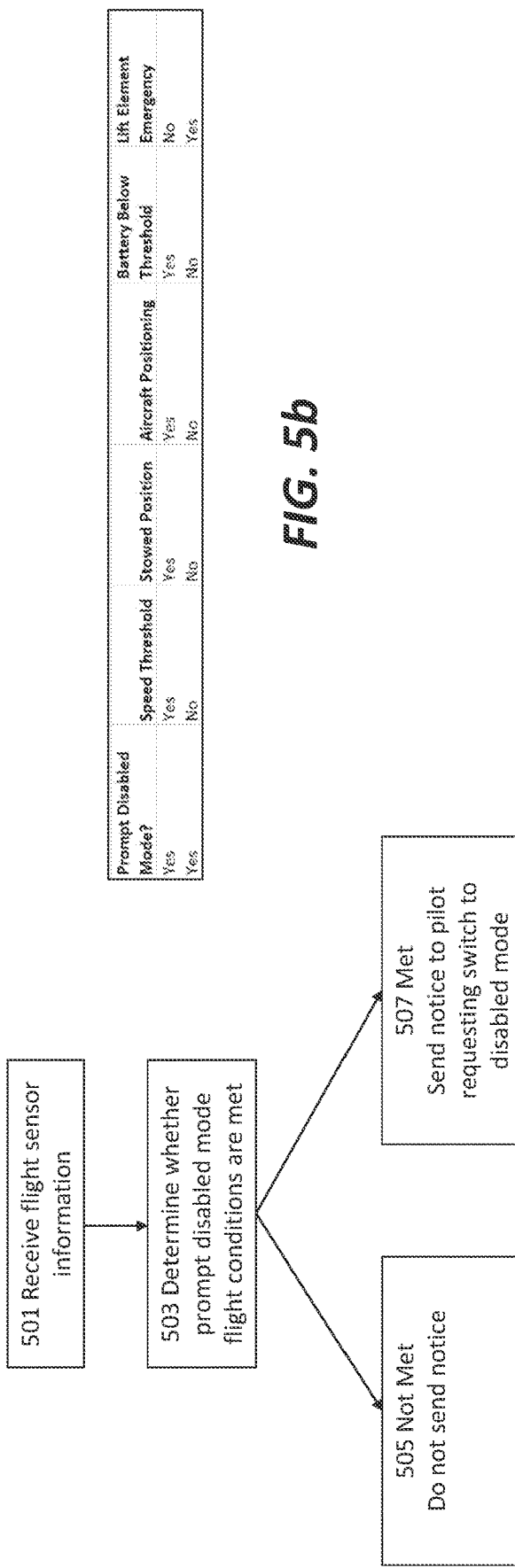

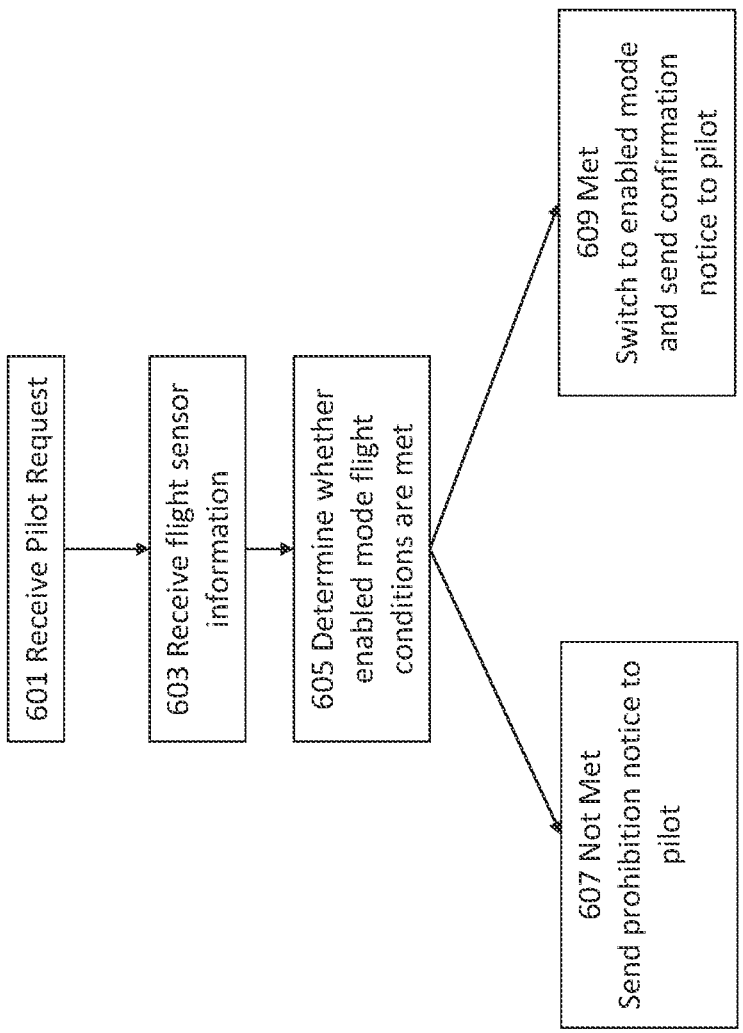

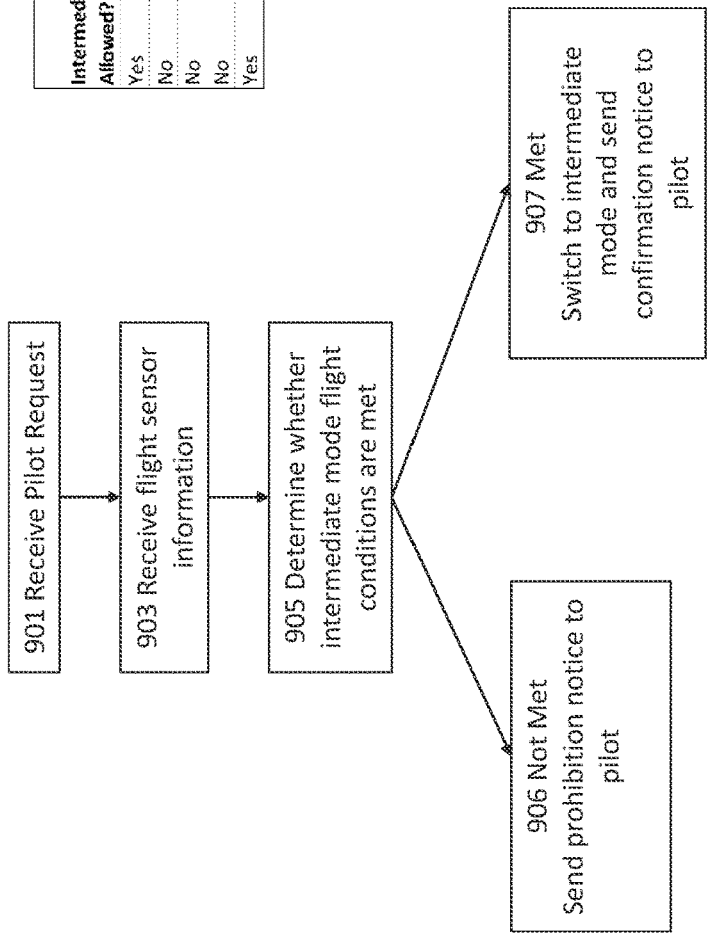

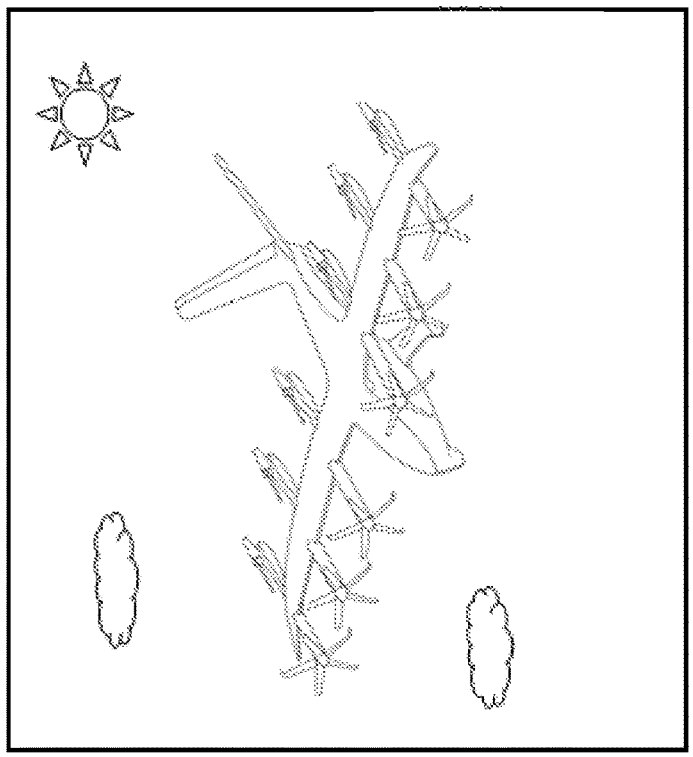
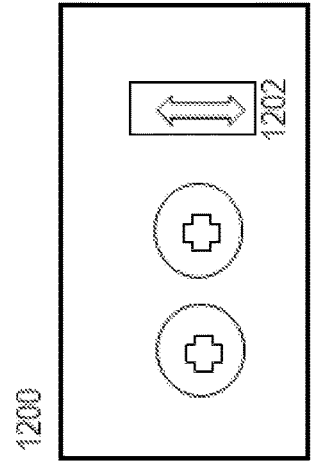
FIG. 12

POWERED LIFT ENABLE AND DISABLE SWITCH

CROSS-REFERENCE TO RELATED APPLICATIONS

This disclosure claims priority to and the benefit of U.S. Provisional Application No. 63/500,706 titled "Powered Lift Enable and Disable Switch," filed May 8, 2023, the contents of which are incorporated herein in their entirety and for all purposes.

TECHNICAL FIELD

This disclosure relates generally to controlling a powered lift aircraft's lift elements. More particularly, and without limitation, the present disclosure relates to switching between an enabled mode, where the lift elements may be controlled to provide lift depending on the aircraft state (e.g., airspeed, altitude, energy availability), and a disabled mode, where the lift elements do not provide lift support.

SUMMARY

The present disclosure generally relates to an aircraft flight control system that controls powered lift elements. As used herein, a powered lift element may refer to one or more moveable structural components of an aircraft that provide lift to the aircraft, such as rotors, proprotors, propellers, tiltrotors, and tiltwings.

One aspect of the present disclosure is directed to a control system for a powered lift aircraft which includes a pilot input device, at least one powered lift element configured to provide powered lift support to the aircraft, and a processor. The processor is configured to receive, from the pilot input device, an input indicative of one of a powered lift enabled mode or a powered lift disabled mode and control the at least one powered lift element to operate the aircraft in a selected one of the powered lift enabled mode or the powered lift disabled mode based on the received input. When the aircraft is in the powered lift enabled mode, the at least one processor is configured to control the at least one powered lift element based on a state of the aircraft. When the aircraft is in the powered lift disabled mode, the at least one processor is configured to control the at least one powered lift element to disable powered lift.

Another aspect of the present disclosure is directed to a method of controlling a powered lift aircraft including receiving, by a processor, from the pilot input device, an input indicative of one of a powered lift enabled mode or a powered lift disabled mode and controlling, by the processor, the at least one powered lift element to operate the aircraft in a selected one of the powered lift enabled mode or the powered lift disabled mode based on the received input. When the aircraft is in the powered lift enabled mode, the at least one processor is configured to control the at least one powered lift element based on a state of the aircraft. When the aircraft is in the powered lift disabled mode, the at least one processor is configured to control the at least one powered lift element to disable powered lift.

BRIEF DESCRIPTION OF DRAWING(S)

FIG. 5a illustrates a flow chart for prompting a switch from enabled mode to disabled mode, consistent with embodiments of the present disclosure.

FIG. 5b illustrates a table for when a prompt for switching to disabled mode may be provided, consistent with embodiments of the present disclosure.

FIG. 6a illustrates a flow chart for switching from disabled mode to enabled mode, consistent with embodiments of the present disclosure.

FIG. 6b illustrates a table for when enabled mode may be allowed, consistent with embodiments of the present disclosure.

FIG. 9a illustrates a flowchart for switching from enabled mode to intermediate mode, consistent with embodiments of the present disclosure.

FIG. 9b illustrates a table for when intermediate mode may be allowed, consistent with embodiments of the present disclosure.

FIG. 12 illustrates a simulator system, consistent with the embodiments of the present disclosure.

DETAILED DESCRIPTION

Figure 1A:
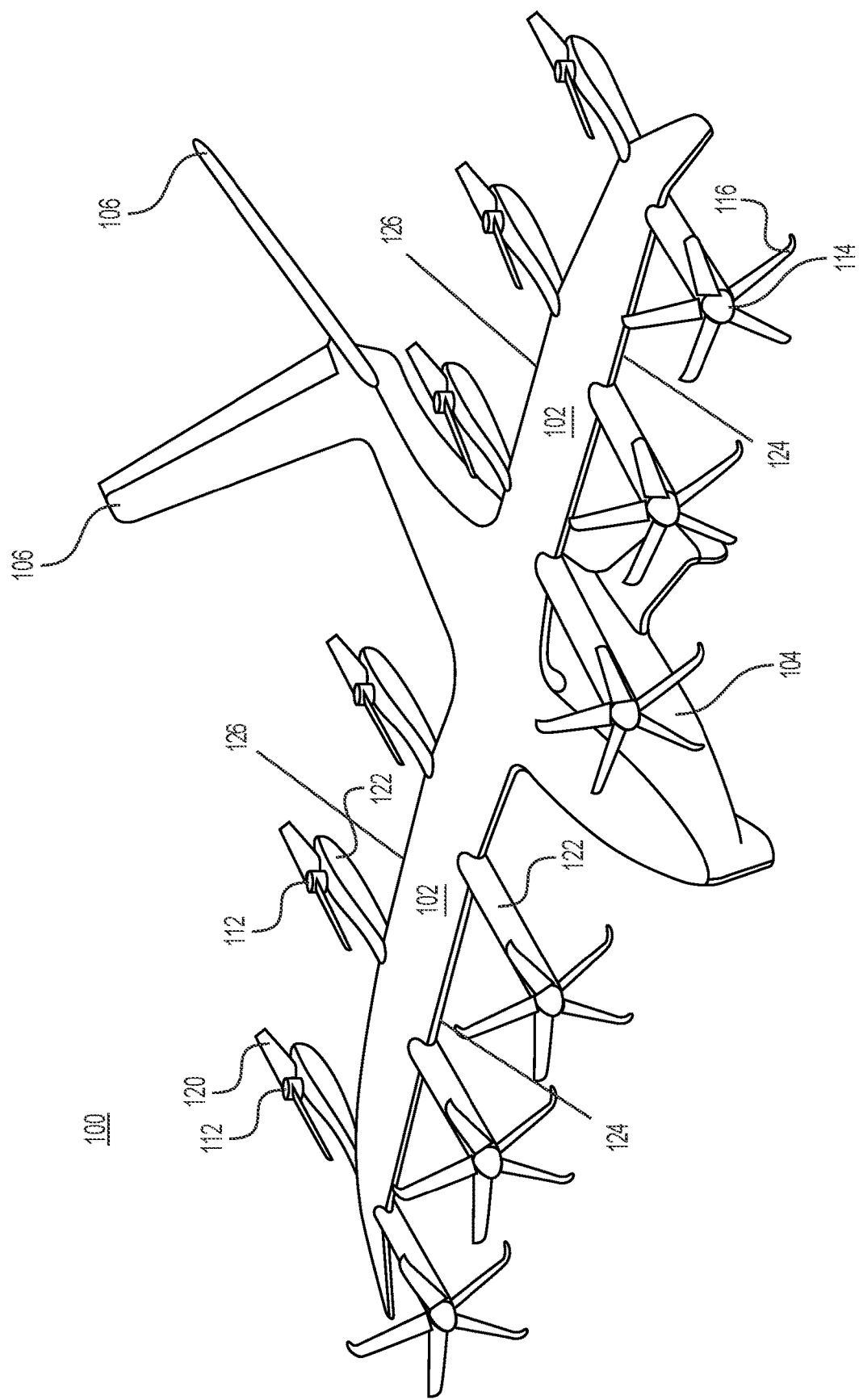
FIG. 1A illustrates an aircraft, consistent with the embodiments of the present disclosure.

The present disclosure addresses components of an aircraft that includes powered lift support. In some embodiments, the aircraft may be a conventional take-off and landing (CTOL) aircraft. In some embodiments, the aircraft may be a short take-off and landing (STOL) aircraft. In some embodiments, the aircraft may be a vertical takeoff and landing (VTOL) aircraft. In some embodiments, the aircraft may be capable of conventional, short, and vertical take-off and landing. In some embodiments the aircraft may be an electric aircraft (e.g. an eVTOL), while in other embodiments the aircraft may be a gas powered or hybrid aircraft. In some embodiments, powered lift elements may be partially tiltable between a more horizontally oriented position (e.g., to generate forward thrust) and a more vertically oriented position (e.g., to generate vertical lift), while in other embodiments the powered lift elements may be completely tiltable between these positions. The aircraft may have any number and combination rotors, proprotors, propellers, tiltrotors, and tiltwings to provide powered lift support. The aircraft may be an airplane, rotorcraft, drone, or any other flying device comprising powered lift elements. The present disclosure details an exemplary embodiment of an electric vertical takeoff and landing (eVTOL) aircraft; however, the disclosed powered lift control system may be included any aircraft that has powered lift support.

The eVTOL aircraft of the present disclosure may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of eVTOL aircraft components.

In some embodiments, the eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electrical engine connected to an onboard electrical power source, which may include a device capable of storing energy such as a battery or capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations.

In some embodiments, the aircraft may have any suitable number of electrical engines, including four, six, eight, ten, fourteen, eighteen, twenty or more. In some embodiments, the distributed electrical propulsion system may include twelve electrical engines, which may be mounted on booms forward and aft of the main wings of the aircraft. The forward electrical engines may be tiltable mid-flight between a horizontally oriented position (e.g., to generate forward thrust) and a vertically oriented position (e.g., to generate vertical lift). The forward electrical engines may be of a clockwise type or counterclockwise type in terms of direction of propeller rotation. The aft electrical engines may be fixed in a vertically oriented position (e.g., to generate vertical lift). They may also be of a clockwise type or counterclockwise type in terms of direction of propeller rotation. In some embodiments, an aircraft may possess various combinations of forward and aft electrical engines. For example, an aircraft may possess six forward and six aft electrical engines, four forward and four aft electrical engines, or any other combination of forward and aft engines, including embodiments where the number of forward electrical engines and aft electrical engines are not equivalent. In some embodiments, an aircraft may possess four forward and four aft propellers, where at least four of these propellers comprise tiltable propellers.

In preferred embodiments, for a vertical takeoff and landing (VTOL) mission, the forward electrical engines as well as aft electrical engines may provide vertical thrust during takeoff and landing. During flight phases where the aircraft is in forward flight-mode, the forward electrical engines may provide horizontal thrust, while the propellers of the aft electrical engines may be stowed at a fixed position in order to minimize drag. The aft electrical engines may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a mostly horizontal direction during forward-flight mode. A variable pitch mechanism may change the forward electrical engine's propeller-hub assembly blade collective angles for operation during the hover-phase, transition phase, and cruise-phase.

In some embodiments, in a conventional takeoff and landing (CTOL) mission, the forward electrical engines may provide horizontal thrust for wing-borne take-off, cruise, and landing. In some embodiments, the aft electrical engines may not be used for generating thrust during a CTOL mission and the aft propellers may be stowed in place.

In some embodiments, an electric engine may be housed or connected to a boom of an aircraft and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller.

In some embodiments, a tilt propeller system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, a tilt propeller system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the tilt propeller system to maintain a propulsion system orientation with the help of, or without, additional power being provided by the system.

In some embodiments, an electrical propulsion system as described herein may generate thrust by supplying High Voltage (HV) electric power to an electric engine, which in turn converts HV power into mechanical shaft power which is used to rotate a propeller. As mentioned above, an aircraft as described herein may possess multiple electric engines which are boom-mounted forward and aft of the wing. The amount of thrust each electric engine generates may be governed by a torque command from the Flight Control System (FCS) over a digital communication interface to each electric engine. Embodiments may include forward electric engines, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, an aircraft may include aft engines, or lifters, that can be of a clockwise (CW) type or counterclockwise (CCW) type. Additional embodiments may include aft electric engines that utilize a multi-blade fixed pitch propeller.

As described herein, the orientation and use of electric propulsion systems may change throughout the operation of the aircraft. In some embodiments, during vertical takeoff and landing, the forward propulsion systems as well as aft propulsion systems may provide vertical thrust during take-off and landing. During the flight phases where the aircraft is in forward flight-mode, the forward propulsion systems may provide horizontal thrust, while the aft propulsion system propellers may be stowed at a fixed position in order to minimize drag. The aft electric propulsion systems may be actively stowed with position monitoring. Some embodiments may include a transition from vertical flight to horizontal flight and vice-versa. In some embodiments, the transitions may be accomplished via the tilt propeller system (TPS). The TPS redirects thrust between a primarily vertical direction during vertical flight mode to a mostly horizontal direction during forward-flight mode. Additional embodiments may include a variable pitch mechanism that may change the forward propulsion system propeller-hub assembly blade collective angles for operation during the hover-phase, cruise-phase and transition phase. Some embodiments may include a Conventional Takeoff and Landing (CTOL) configurations such that the tilters provide horizontal thrust for wing-borne take-off, cruise and landing. The aft electronic engines are not used for generating thrust during a CTOL mission and the aft propellers are stowed in place.

Embodiments electrical engines may include an electrical motor comprising a stator enclosure, a wound stator assembly, a rotor, various bearings, and any additional components such that to assist in transferring the speed and torque generated by the motor to a propeller.

Additional embodiments of electrical engines may include active protection features in the forward and aft electrical engines such as monitoring internal temperatures throughout the engine operation, including oil temperature, stator winding sets, inverter bulk capacitors, power modules, control board power modules, control board control processors, control board monitor processors, internal hot-spots, and other various locations throughout the engine. Embodiments may include overtemperature limits that take into account known failure temperatures and operating limits in relation to auto-ignition temperatures of fluids. Some embodiments may include a High Voltage Power System that may have fuses at the high voltage battery terminals which may rapidly disconnect the engine electrical connection irreversibly to mitigate overcurrent events. This overcurrent protection may be activated when the electric engine current draw is greater than the Overcurrent operating. As such, in some embodiments, failure conditions which lead to overcurrent may only lead to a transient overheating, arc or spark faults.

As described above, powered lift aircrafts, such as the eVTOL aircraft, may include lift elements, such as rotors, proprotors, propellers, tiltrotors, and tiltwings that may provide lift to the aircraft. During vertical takeoff, these lift elements may be activated to provide the lift required for the aircraft to get off the ground. After the aircraft airspeed exceeds a speed threshold, the lift elements may be automatically switched to a powered-lift inactive state by powering off, storing, stowing, and/or switching to a forward thrust position. The aircraft may then receive its lift through the wings and other static lifting surfaces. As the aircraft's airspeed is reduced below a speed threshold, the lift elements may be automatically re-activated to provide lift for low-speed flight and/or to allow for vertical landing. The amount of lift element activation may be based on a state of the aircraft (e.g. airspeed, altitude etc.). Therefore, these lift elements may provide critical controllability to the powered lift aircraft and allow low-speed travel and take-off/landing with limited runway distance. They also make up for lift deficiencies in the wings and other lifting surfaces.

However, sometimes a pilot may wish to land the aircraft without the powered lift elements being activated (i.e. in "winged flight"). For example, in some embodiments, the pilot might desire a quicker landing, may not have access to a hover pad, or may recognize a critical condition of the lift elements. In some embodiments, the pilot may recognize a winged landing is necessary because the gross weight of the aircraft exceeds a weight capable of being supported by the powered lift elements in a vertical or short landing. The re-activation of the lift elements during a winged landing may interfere with the safe landing of the aircraft and/or create unnecessary energy drain. The disclosed aircraft control system provides the pilot a switch to disable activation of the lift elements. As a result, after switching to disabled mode, when a pilot is landing in winged flight and the airspeed of an aircraft is reduced below the speed threshold (i.e. the threshold that activates lift elements), the lift elements may remain inactive. In the disabled condition, the lift elements may not interfere with the winged flight landing and the energy required to power the lift elements may be preserved.

Additionally, a pilot may be unaware of whether it is safe to switch from powered lift enabled mode to powered lift disabled mode and vice versa. The disclosed aircraft control system provides information on one or more flight conditions of the aircraft that prohibit a switch and prompts the pilot to switch modes based on detected flight conditions.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 1B:
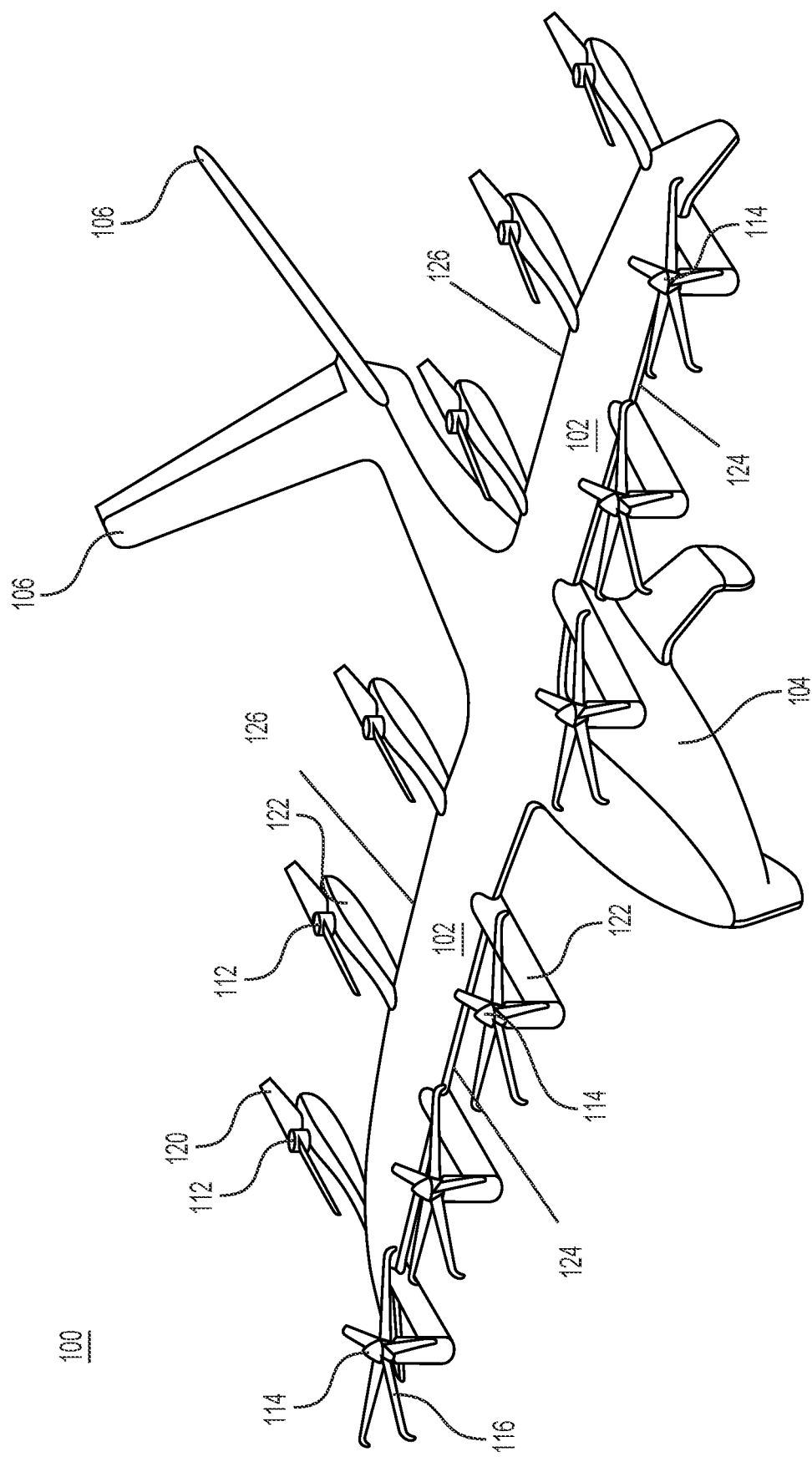
FIG. 1B illustrates another aircraft, consistent with the embodiments of the present disclosure.

FIG. 1A illustrates an aircraft 100, consistent with the embodiments of the present disclosure. FIG. 1B illustrates another aircraft 100, consistent with the embodiments of the present disclosure. Aircraft 100 may include a fuselage 104, wing 102 mounted to the fuselage 104, and one or more rear stabilizers 106 mounted to the rear of the fuselage 104. The fuselage 104 may comprise the aircraft's main body section and may hold crew, passengers, or cargo. The stabilizers 106 may provide longitudinal (pitch) and/or directional (yaw) stability. According to some embodiments, the rear stabilizers 106 may include control surfaces, such as one or more rudders, one or more elevators, and/or one or more combined rudder-elevators, movement of which may help to provide the longitudinal (pitch) and/or directional (yaw) stability.

The wings 102 may have any suitable design. In some exemplary embodiments, wing 102 may be an integrated wing that may include both a left wing 102 and a right wing 102. In other exemplary embodiments wing 102 may refer to a distinct left wing 102 and/or a distinct right wing 102. Booms 122 may be mounted beneath the wings 102, on top of the wings, and/or may be integrated into the wing profile. Booms 122 may help connect rotors 112 and proprotors 114 to the wings 102 and/or fuselage 104.

A plurality of rotors 112 may be mounted to the one or more wings 102 and may be configured to provide lift for vertical take-off and landing. A plurality of proprotors 114 may be mounted to the one or more wings 102 and may be tiltable between a lift configuration, as shown in FIG. 1B, and a propulsion configuration, as shown in FIG. 1A. In a lift configuration, the proprotors 114 provide the lift required for vertical take-off and landing, and hovering. In a propulsion configuration, the proprotors 114 provide forward thrust for the aircraft. In some embodiments the rotors 112 are configured for providing lift only, with all propulsion being provided by the proprotors 114. When rotors 112 are configured to provide lift only, the rotors 112 may be in fixed orientations relative to fuselage 104.

In some exemplary embodiments, the rotors 112 may each have two blades 120. In other exemplary embodiments, the rotors 112 have more than two blades. In some exemplary embodiments, the proprotors 114 may include more blades than the rotors 112. For example, as illustrated in FIGS. 1A and 1B, the rotors 112 may each include two blades 120 and the proprotors 114 may each include five blades 116. According to various embodiments, the proprotors 114 may have from 2 to 5 blades. It is contemplated, however, that the rotors 112 and/or proprotors 114 may include any number of blades. The blades (120, 116) may have an airfoil-shaped cross section or any other cross-section that accommodates the lift and thrust requirements of the aircraft 100.

In some embodiments the aircraft 100 is an electrical aircraft (VTOL or eVTOL) and the rotors 112 and/or proprotors 114 include an electric motor driving the blades (120, 116) and a motor controller for controlling powering the motor. In some embodiments a battery pack may provide power to a collection of rotors 112 and/or proprotors 114. In some embodiments a battery pack may power a single rotor 112 or proprotor 114, or a portion of a single rotor 112 or proprotor 114. In some embodiments each rotor 112 and/or proprotor 114 may have its own associated battery pack. A "battery pack" may refer to any combination of electrically connected batteries (i.e. battery cells) and may include a plurality of batteries arranges in series, parallel or a combination of series and parallel.

In some embodiments, the rotors 112 and/or proprotors 114 may be powered by internal combustion engines (e.g., intermittent combustion or reciprocating engines). In some embodiments the rotors 112 and/or proprotors 114 may be powered by turbines (e.g., continuous combustion or continuous rotation engines). These various engines may be mounted to load bearing pylons on the wing 102. Additionally, or alternatively, the engines may be mounted elsewhere in the aircraft and high voltage electrical wiring may power the rotors 112 and/or proprotors 114. In various embodiments the power generation of the aircraft 100 may include any combination of power generation units, including batteries, turbine engines, internal combustion engines and/or any other type of device that generates electrical power.

Figure 2:
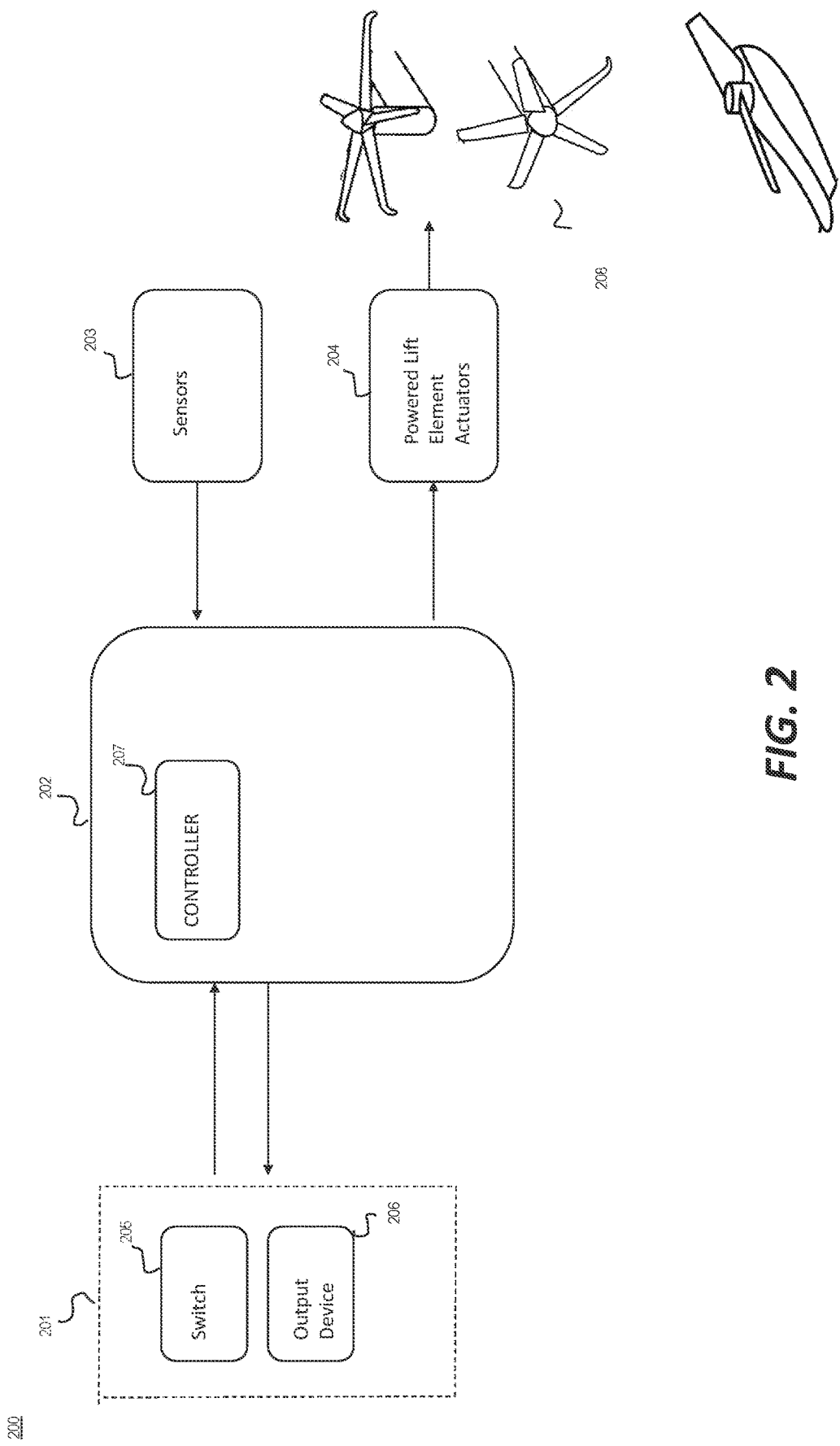
FIG. 2 illustrates an aircraft control system for controlling aircraft lift elements, consistent with the embodiments of the present disclosure.

FIG. 2 illustrates an aircraft control system 200 for controlling aircraft lift elements, consistent with the embodiments of the present disclosure. In some embodiments, lift elements may include rotors 112 and/or proprotors 114, as shown in FIG. 1A-1B. A switch 205 may allow the pilot to switch from a powered lift enabled mode to a powered lift disabled mode and vice versa. In some embodiments, the switch 205 may be a physical switch, button, and/or lever. In some embodiments, the switch 205 may be a user interface element provided on a display screen or control panel to the pilot. In some embodiments, the switch 205 may be a processor that may receive a pilot's manual selection and/or voice command requesting a mode switch. The switch 205 may include any means that allows the pilot to select a desired mode of operation. The switch 205 may send a signal to a flight control computer 202 and associated controller 207 indicating a pilot request to switch modes. In some embodiments, the signal may be sent directly from the switch 205 to the flight control computer 202. In other embodiments, one or more processors, microprocessors, and/or computers may receive an input from the switch 205 and may provide a signal indicating the request to flight control computer 202.

Output device 206 may be or include any suitable device that provides output to a pilot, such as a display, lights, touch screen, haptics device, virtual/augmented reality display, or speakers. Output device 206 may receive signals from flight control computer 202. In some embodiments, the output device 206 may receive a signal directly from the flight control computer 202 indicating a notice to be presented. In other embodiments, the signal may be received indirectly from the flight control computer 202, through one or more processors, microprocessors, and/or computers. In some embodiments, switch 205 and/or output device 206 may be located on a dashboard 201 of a pilot cockpit. In other embodiments, the switch 205 and/or output device 206 may be located separately from a dashboard but still in the vicinity of a pilot.

Sensors 203 may provide information on the aircraft state. Sensors 203 may directly detect a property of an aircraft and/or may include processors that receive information from other detecting devices and determine the property of the aircraft based on the received information. Sensors 203 may collect and/or receive information on the aircraft's airspeed and/or acceleration, e.g., through a differential pressure gauge, dynamic pressure sensor, an accelerometer, altimeter, and/or a GPS device. The aircraft's airspeed may be a calibrated air speed, which is an indicated airspeed corrected for instrument and position errors. If there is no wind, the calibrated airspeed may be the same as the ground speed. Sensors 203 may also collect and/or receive information on the orientation of an aircraft along its tilt, rotation, and/or pitch axes, e.g., through an accelerometer, gyroscope and/or magnetometer. Sensors 203 may also receive control feedback from lift elements (e.g., actuators) and/or pilot controls (e.g., a control stick). Sensors 203 may also collect and/or receive information on the weight of the aircraft, e.g., through strain gauges, load cells, and/or transducers. Sensors 203 may also collect and/or receive information on the positioning of landing gear, e.g., through a limit switch, magnetic sensor, and/or any other proximity sensor.

Sensors 203 may also collect and/or receive information on the functioning of lift elements. For example, sensors 203 may include a battery level sensor, such as a voltmeter, current sensor, temperature sensor, or other device capable of detecting a battery state (e.g., state of charge or state of energy). Sensors 203 may also detect a tilt position of a wing and/or proprotor, e.g., a pressure sensor detecting an angle of attack and/or a hall effect sensor. Sensors 203 may detect rotation speed of blades on rotors, proprotors, or tiltrotors, e.g., through a hall effect sensor, a magnetic sensor, or other rotation sensor. Sensors 203 may detect the state of electrical circuitry to lift elements, e.g., through current sensors, voltage sensors, power meters, or other devices capable of measuring one or more electrical characteristics.

Powered lift element actuators 204 may receive signals from a flight control computer 202 and control lift elements 208, such as rotors 112 and proprotors 114. Powered lift actuators 204 may include computers, processors, and/or microprocessors capable of receiving signals and controlling the lift elements 208. In some embodiments, the powered lift element actuators 204 may control the speed of the blades of the lift element 208, power to the lift element, and/or a tilt angle of the lift element.

Flight control computer 202 may include one or more processors, input/output devices, and/or memory. Flight control computer 202 may also include a controller 207, which may include one or more processors and/or microprocessors. In some embodiments, flight control computer 202 may be a single computer, while in other embodiments the flight control computer 202 may include multiple computers in communication with each other. The flight control computer 202 may receive signals from sensors 203 and pilot inputs from the dashboard 201 (e.g., a signal from switch 205). Based on this information, the flight control computer 202 and/or controller 207 may provide signals to an output device 206 and the powered lift element actuators 204.

Figure 3:
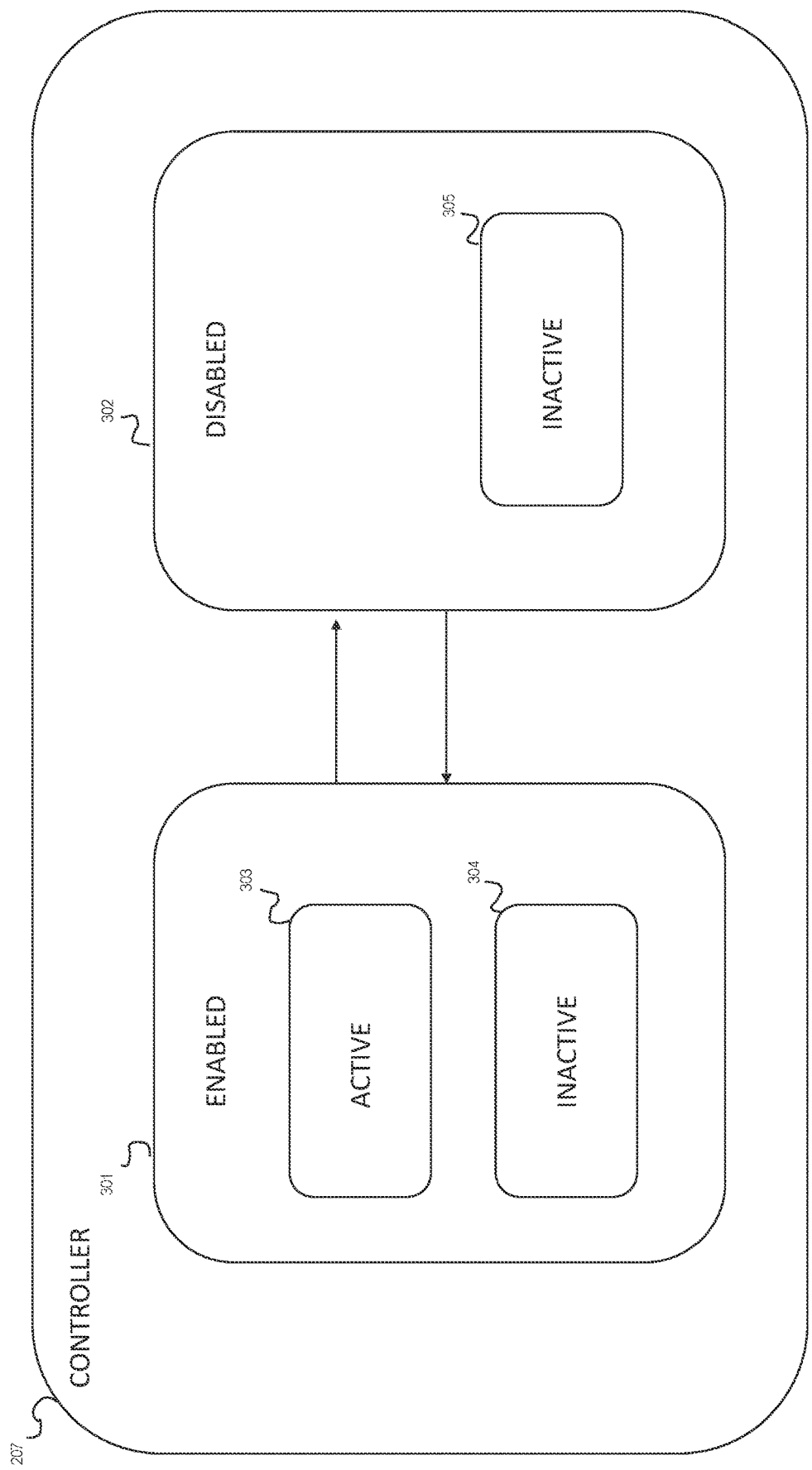
FIG. 3 illustrates a controller, consistent with the embodiments of the present disclosure.

FIG. 3 illustrates a controller 207, consistent with the embodiments of the present disclosure. As described above, in some embodiments, the controller 207 may be included as part of the flight control computer 202. However, in other embodiments the controller 207 may be located separately from the flight control computer 202. The controller 207 may switch between an enabled mode 301 and a disabled mode 302. In an enabled mode 301, controller 207 and/or flight control computer 202 may automatically switch between a powered lift active state 303 and a powered lift inactive state 304. In a powered lift active state 303, the flight control computer 202 may control the powered lift element actuators 204 by sending signals to actuators 204 to allow the aircraft to fly in a powered lift configuration. For example, in an active state, flight control computer 202 may determine (e.g., based on signals from sensors 203) to increase the speed of rotation on the lift element 208. Additionally, in an active state, flight control computer 202 may determine (e.g., based on signals from sensors 203) to change the tilt angle of lift element 208. For example, the flight control computer 202 may change the proprotors 114 to a lift configuration, as shown in FIG. 1B. In a powered lift inactive state 304, the flight control computer 202 may control the powered lift element actuators 208 to allow the aircraft to fly in a winged flight configuration. For example, in an inactive state 304, flight control computer 202 may determine (e.g., based on signals from sensors 203) to decrease and/or stop the rotation of the blades on the lift elements 208. Additionally, in an inactive state 304, flight control computer 202 may determine (e.g., based on signals from sensors 203) to change the tilt of the lift elements 208 to a forward thrust configuration (e.g., FIG. 1A) and/or a stowed configuration. Additionally, in an inactive state 304, once the powered-flight lift elements 208 are in a stowed and/or forward thrust configuration, flight control computer 202 may be prevented from sending further signals to cause operation of the powered lift element actuators 204.

In enabled mode 301, controller 207 may automatically switch between the active state 303 and the inactive state 304 based on flight conditions, including the aircraft's airspeed. In a powered lift enabled mode 301, the aircraft may switch from an active state 303 to an inactive state 304 when the aircraft's airspeed exceeds a first speed threshold. In some embodiments, this first speed threshold may be: 1.2× the stall speed. In a powered lift enabled mode 301, the aircraft may automatically switch from an inactive state 304 to an active state 303 when the aircraft's airspeed speed drops below a second threshold. In some embodiments, this second speed threshold may be: 1.15× the stall speed, while in other embodiments it may be as low as the stall speed. In some embodiments, the first and second threshold may be the same value, while in other embodiments the first speed threshold (to switch from active to inactive) may be greater than the second speed threshold (to switch from inactive to active). The controller 207 may set the stall speeds and/or speed thresholds in consideration of load factors based on measurements from the sensors 203. For example, controller 207 (using sensors 203) may detect that the aircraft is operating at a high normal load factor (e.g., because the aircraft is at a high bank angle) and may increase a speed threshold that allows for inactive state or disabled mode. Additionally, controller 207 (using sensors 203) may detect that the aircraft is operating at a low longitudinal load factor (e.g., because the aircraft is decelerating) and may increase a speed threshold that allows for inactive state or disabled mode. Additionally, controller 207 (using sensors 203) may detect that the aircraft is operating at a high longitudinal load factor (e.g., because the aircraft is accelerating) and may decrease a speed threshold that allows for inactive state or disabled mode. Therefore, the controller 207 is able to quickly anticipate powered-lift requirements and control the lift elements 208 accordingly.

In some embodiments, switching to an enabled mode 301 may include the controller 207 may send instructions in the form of a signal, command, and/or change of data field to allow the flight control computer 202 to operate lift elements in a manner that provides lift to the aircraft. In some embodiments, operation of the lift elements may be enabled by operation of an electrical switching device (e.g., transistor, relay, contactor). For example, power may be connected to the motor of a lift element through operation of the electrical switching device.

In disabled mode 302, the controller 207 may only allow the aircraft to be controlled in a powered lift inactive state 305. In some embodiments, in a powered lift inactive state 305, the flight control computer 202 may control the powered lift element actuators 204 to allow the aircraft to fly in a winged configuration. For example, in an inactive state 305, flight control computer 202 may determine (e.g., based on signals from sensors 203) to decrease and/or stop the rotation of the rotors on the lift elements 208. Additionally, in an inactive state 305, flight control computer 202 may determine (e.g., based on signals from sensors 203) to change the tilt of lift elements 208 to a forward thrust configuration, as shown in FIG. 1A, for providing forward thrust to the aircraft. Additionally, in an inactive state 305, once the powered lift elements are in a stowed and/or forward thrust configuration, flight control computer 202 may be prohibited from sending further signals (e.g., signals that may cause them to operate in a lift configuration) to the powered lift element actuators 204. In other embodiments, in inactive state 305 the powered lift elements may already be stowed and/or in a forward thrust configuration, and the flight control computer 202 may be prohibited from sending further signals (e.g., signals that may cause them to operate in a lift configuration) to the powered lift element actuators 204.

In some embodiments, switching to a disabled mode 302 may include the controller 207 sending instructions in the form of a signal, command, and/or change of data field to prevent the flight control computer 202 from operating lift elements in a manner that provides lift to the aircraft. In some embodiments, operation of the lift elements may be prevented by operation of an electrical switching device (e.g., transistor, relay, contactor). For example, power may be disconnected to the motor of a lift element through operation of the electrical switching device.

Figures 4A, 4B:
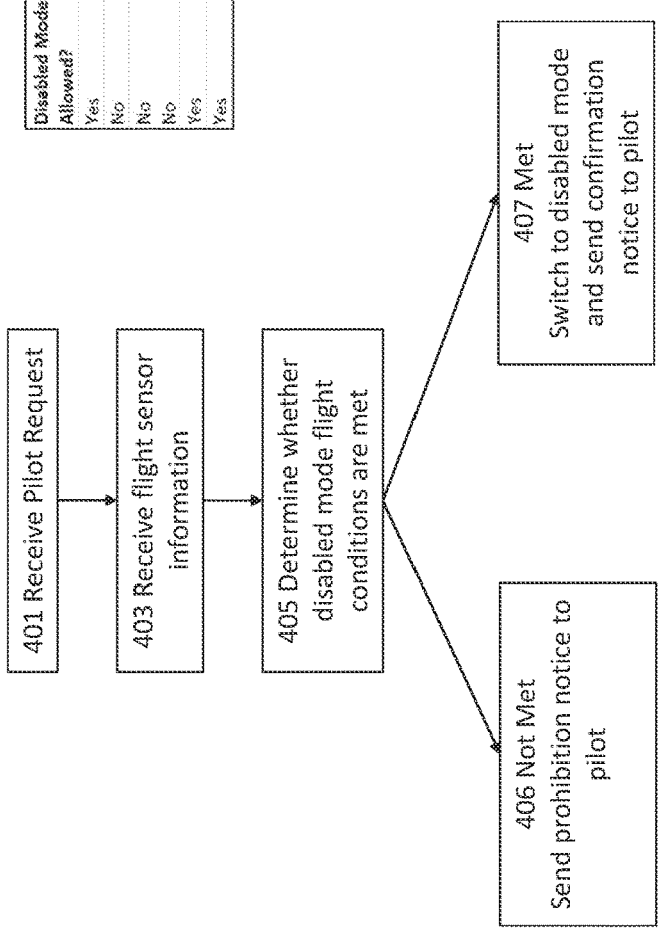
FIG. 4a illustrates a flow chart for switching from enabled mode to disabled mode, consistent with embodiments of the present disclosure.
FIG. 4b illustrates a table for when disabled mode may be allowed, consistent with embodiments of the present disclosure.

FIG. 4a illustrates a flow chart for switching from enabled mode 301 to disabled mode 302, consistent with embodiments of the present disclosure. At step 401, controller 207 may receive a pilot request through switch 205 requesting an aircraft be switched from a powered lift enabled mode 301 to a disabled mode 302. At step 403, the controller 207 may gather flight sensor information from sensors 203. In some embodiments, the controller 207 may gather this information directly from sensors 203, while in other embodiments, flight sensor information may be stored in a memory and/or database accessible by the controller 207. Information gathered from the flight sensors 203 may include any information necessary to determine whether conditions to switch to a disabled mode are satisfied. In some embodiments, information may be gathered on an aircraft's airspeed. In some embodiments, information may be gathered on the position of a lift element 208 (e.g., whether lift elements are in lift, forward thrust, and/or stowed configuration), and its status (e.g., whether the lift elements are electrically connected, are rotating as intended etc.). In some embodiments, information may be gathered on an aircraft's positioning along its various axes (pitch, roll, yaw) and its movement across those axes. In some embodiments, information may be gathered on an aircraft's altitude and whether its wheels are deployed and/or touching the ground.

At step 405, based on this information, controller 207 may make a determination of whether disabled mode 302 flight conditions are satisfied and whether the aircraft can be transitioned into disabled mode 302. FIG. 4b illustrates a table of exemplary conditions under which a switch to disabled mode 302 may be allowed. In some embodiments, when an aircraft is determined to be in flight based on sensor information received at step 403, a disabled mode may only be allowed if the aircraft satisfies certain in-flight requirements or when lift elements are experiencing an emergency condition. In-flight requirements may include verifying that an aircraft's airspeed is above a third speed threshold. In some embodiments, the third speed threshold may be the same as the first speed threshold used in an enabled mode 301 to switch to an inactive state 304. In other embodiments, the third speed threshold may in the range of 1.05-1.30× the stall speed. In-flight requirements may include verifying that a flight lift element 208 is in a stowed and/or forward thrust position. In some embodiments, this may include verifying that the tilt angle of a lift element 208 matches a stowed and/or forward thrust position. In other embodiments, this may include verifying that the tilt angle of lift element 208 is within a set proximity of its stowed and/or forward thrust position. For example, angle of a lift element 208 may be determined to be within 10 degrees of a stowed and/or forward thrust orientation. In some embodiments, verifying a stowed position may include verifying that the rotation of the rotors is stopped and/or nearly stopped.

In-flight requirements may include verifying that an aircraft positioning is safe to transition to disabled mode. In some embodiments, this may include verifying that the orientation of the aircraft along its roll and pitch axes are such that winged-flight can be maintained. In some embodiments, this may include verifying that the aircraft is not undergoing a maneuver that would make maintaining winged-flight unsafe. For example, the controller 207 may verify whether the aircraft attitude and/or dynamics is outside of the normal flight envelope for the pitch, roll or yaw axes for a given flight condition. Even if one or more of the in-flight requirements are not met, the controller 207 may determine that a switch to disabled mode 302 may be allowed because the aircraft is determined to be on the ground in a taxi phase of flight or stationary, thereby allowing the pilot to undertake a winged flight takeoff. Additionally, even if one or more of the in-flight requirements are not met, a switch to disabled mode 302 may be allowed when the aircraft is experiencing a lift element emergency. In some embodiments, a lift element emergency may be detected when the lift elements are operating in a condition that may compromise the controllability of the aircraft. In some embodiments, a lift element emergency may be detected by a malfunction (e.g., power failure and/or lack of rotation) to a set number of lift elements 208 on a certain side of the aircraft (e.g., if 2 of 3 lift elements on a left side of the aircraft are not rotating). In some embodiments, a lift element emergency may be detected based on the movement of an aircraft in an unusual manner. In some embodiments, even if an aircraft is experiencing a lift element emergency as described above, a switch to disabled mode 302 may be prevented if the aircraft airspeed is below the stall speed.

At step 406, if the disabled mode 302 flight conditions are not met, a notice may be provided to the pilot (e.g., through output device 206) indicating that a switch to disabled mode is not allowed. In some embodiments, the notice may include details stating which of the one or more flight conditions are not met. For example, in some embodiments the output device 206 may be a display and the notice may state or indicate "speed threshold not met", and/or "stowed position not met", and/or "aircraft dynamics cannot support winged-flight". The notice may provide further details on corrections the pilot may make in order for switch to disabled mode 302 to be allowed.

At step 407, if disabled mode 302 conditions are met, controller 207 may provide a notice to the pilot indicating a switch to disabled mode 302. Further, in some embodiments, the controller 207 may send instructions in the form of a signal, command, and/or change of data field to prevent the flight control computer 202 from operating lift elements in a manner that provides lift to the aircraft. In some embodiments, this prohibition may be performed by changing the circuitry, through operation of a switch, transistor, etc. Therefore, even as the aircraft airspeed drops below the second threshold speed (i.e. a speed in enabled mode 301 that activates lift elements 208), the flight control computer 202 may be prohibited from sending lift signals to lift element actuators 208. Thus, the winged flight of the aircraft may be continued with no disturbance or intervention from the lift elements 208.

FIG. 5a illustrates a flow chart for prompting a switch from enabled mode 301 to disabled mode 302, consistent with embodiments of the present disclosure. At step 501, the controller 207 may monitor the aircraft in-flight conditions through sensors 203. In some embodiments, the controller 207 may gather this information directly from sensors 203, while in other embodiments, flight sensor information may be stored in a memory and/or database accessible by the controller 207. Information gathered from the flight sensors 203 may include any information necessary to determine whether conditions to switch to a disabled mode are satisfied. In some embodiments, information may be gathered on an aircraft's airspeed. In some embodiments, information may be gathered on the position of a lift element 208 (e.g., whether lift elements are in lift, forward thrust, and/or stowed configuration), and its status (e.g., whether the lift elements are electrically connected, are rotating as intended etc.). In some embodiments, information may be gathered on an aircraft's dynamics along its various axes (pitch, roll, yaw) and its movement across those axes. In some embodiments, information may be gathered on the battery level of a battery pack associated with one or more lift elements 208.

At step 503, based on this information, controller may decide whether flight conditions are satisfied to provide a notice to the pilot prompting disable mode. FIG. 5b illustrates a table of exemplary conditions under which switching to disabled mode 302 may be permitted. In-flight conditions may include whether the airspeed of an aircraft is above a fourth speed threshold. In some embodiments, the fourth speed threshold may be the same as the first speed threshold (used in an enabled mode 301 to switch to an inactive state 304) and/or third speed threshold (used to switch from enabled mode 301 to disabled mode 302) described above. In other embodiments, the fourth speed threshold may be different from the first speed threshold and third speed threshold. As described above in relation to FIG. 4a, in-flight requirements may further include verifying that a flight lift element 208 is in a stowed and/or forward thrust position, and that the aircraft positioning is safe to transition to disabled mode. The controller 207 may further verify whether the battery level of one or more battery packs associated with the lift elements 208 is below a set threshold (e.g. a threshold state of charge or state of energy). Disabled mode 302 may be prompted when the in-flight requirements are satisfied (e.g., airspeed met, lift elements stowed, and safe positioning) and the battery level of one or more battery packs associated with the lift elements 208 is below the set threshold. Alternatively, even if one or more of the in-flight requirements are not met, a prompt may still be provided if there is a lift element emergency leading to aircraft instability or compromised controllability and the airspeed is still above a stall speed, as described above in reference to FIG. 4a.

At step 505, if the flight conditions to prompt disabled mode are not met, the controller 206 may not provide a notice to the pilot and may continue to monitor the state of the aircraft based on sensors 203. At step 507, if the flight conditions to prompt disabled mode 302 are met, the controller 207 may provide a notice to the pilot (e.g., through output device 206) requesting the pilot to switch to disabled mode 302. In some embodiments, the controller 207 may not switch to disabled mode 302 unless the pilot operates the switch 205. In other embodiments, the controller 207 may automatically switch to disabled mode and may notify the pilot of the switch.

FIG. 6a illustrates a flow chart for switching from disabled mode 302 to enabled mode 301, consistent with embodiments of the present disclosure. At step 601, controller 207 may receive a pilot input through switch 205 requesting an aircraft be switched from a powered lift disabled mode 302 to an enabled mode 301. At step 603, the controller 207 may gather flight sensor information from sensors 203. In some embodiments, the controller 207 may gather this information directly from sensors 203, while in other embodiments, flight sensor information may be stored in a memory and/or database accessible by the controller 207. Information gathered from the flight sensors 203 may include any information necessary to determine whether conditions to switch to an enabled mode 301 are satisfied. In some embodiments, information may be gathered on the position of a lift element 208 (e.g., whether lift elements are in lift, forward thrust, and/or stowed configuration), and its status (e.g., whether the lift elements are electrically connected, are rotating as intended etc.). In some embodiments, information may be gathered on an aircraft's positioning along its various axes (pitch, roll, yaw) and its movement across those axes. In some embodiments, information may be gathered on an aircraft's altitude and whether its wheels are deployed. In some embodiments, information may be gathered on the battery level of one or more battery packs associated with lift elements 208.

At step 605, based on this information, controller 207 may make a determination of whether enabled mode 301 flight conditions are satisfied and the aircraft may be transitioned to enabled mode 301. FIG. 6b illustrates a table of exemplary conditions under which a switch to enabled mode 301 may be permitted. In some embodiments, enabled mode 301 may be permitted if there is not a lift element emergency (as described above in relation to FIG. 4a) and the battery level of the lift elements 208 is at or above a set threshold level (e.g. a threshold state of charge or state of energy). However, if the battery level is below the set threshold level, then a switch to enabled mode may be prohibited. Similarly, if the lift elements are experiencing an emergency condition that may affect the stability of the aircraft, then a switch to enabled mode may be prohibited.

At step 607, if the enabled mode 301 flight conditions are not met, the controller 207 may provide a notice to the pilot (e.g., through output device 206) indicating that a switch to enabled mode is prohibited. In some embodiments, the notice may include details stating which of the one or more flight conditions are not met. For example, in some embodiments output device 206 may be a display the notice may state "lift element battery level below set threshold" and/or "lift element experiencing malfunction".

At step 609, if the enabled mode 301 flight conditions are met, controller 207 may provide a notice to the pilot indicating a switch to enabled mode 301. Further, in some embodiments, the controller 207 may send instructions in the form of a signal, command, and/or change of data field to allow the flight control computer 202 to operate lift elements in a manner that provides lift to the aircraft. In some embodiments, operation of the lift elements may be enabled by operation of an electrical switching device (e.g., transistor, relay, contactor). For example, power may be connected to the motor of a lift element through operation of the electrical switching device.

Figure 7:
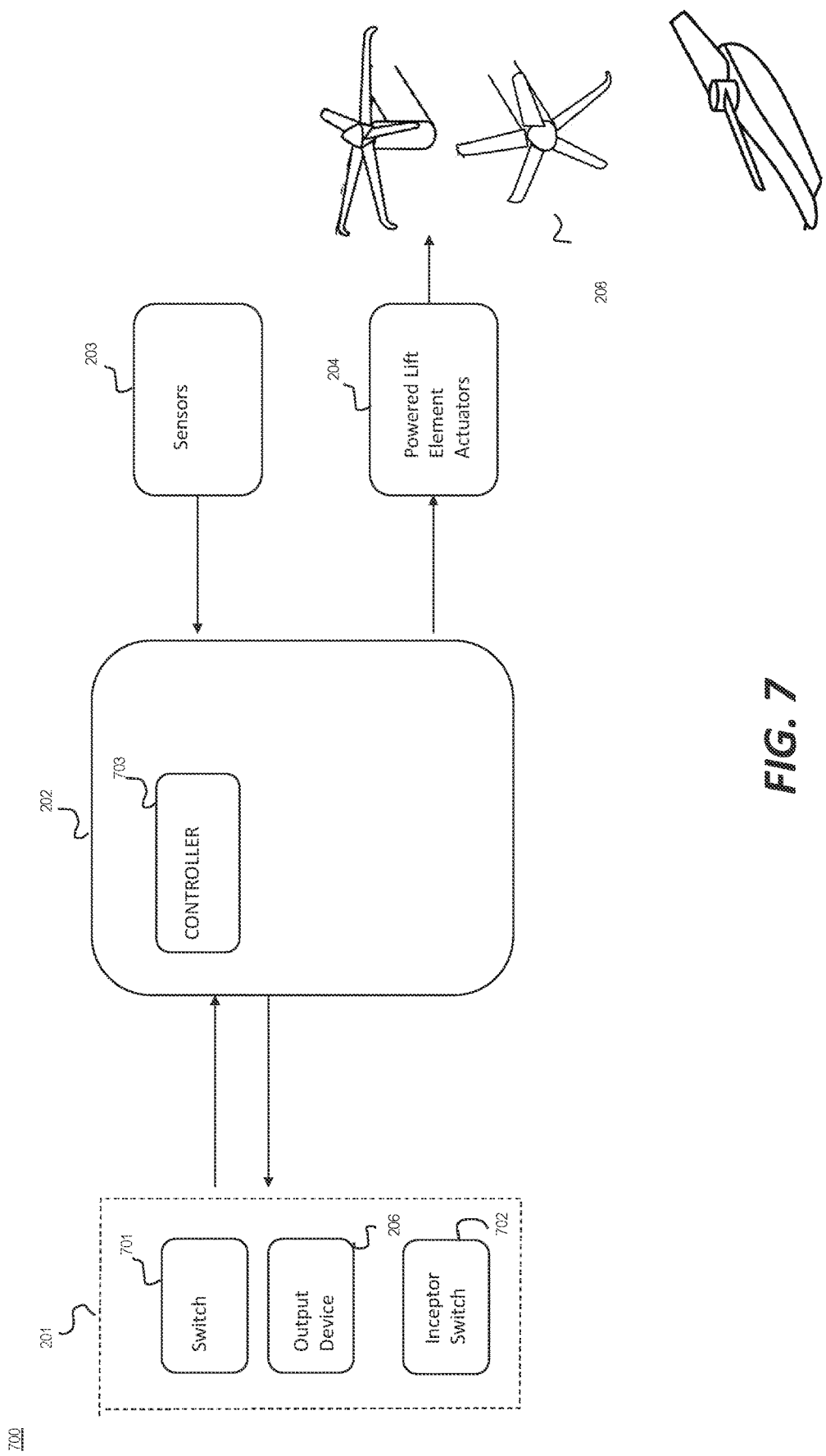
FIG. 7 illustrates another aircraft control system for controlling aircraft lift elements, consistent with the embodiments of the present disclosure.

FIG. 7 illustrates another aircraft control system 700 for controlling aircraft lift elements, consistent with embodiments of the present disclosure. As shown, the control system 700 includes many of the elements of control system 200 shown in FIG. 2. The control system 700 further includes a switch 701 which allows the pilot to switch between a powered lift enabled mode, a powered lift intermediate mode, and a powered lift disabled mode. In some embodiments, the switch 701 may allow switching directly between each mode. In some embodiments, the switch 701 may be a physical switch, button, and/or lever. In some embodiments, the switch 701 may be a user interface element provided on a display screen or control panel to the pilot. In some embodiments, the switch 701 may be a processor that may receive a pilot's manual selection and/or voice command requesting a mode switch. The switch 701 may include any means that allows the pilot to select a desired mode of operation. The switch 701 may send a signal to a flight control computer 202 and associated controller 703 indicating a pilot request to switch modes. In some embodiments, the signal may be sent directly from the switch 701 to the flight control computer 202. In other embodiments, one or more processors, microprocessors, and/or computers may receive an input from the switch 701 and may provide a signal indicating the request to flight control computer 202.

Control system 700 may further include an inceptor switch 702. The pilot may use the inceptor switch 702 to provide a configuration airspeed of the aircraft to the controller 703 and/or flight control computer 202. In some embodiments, the controller 703 and/or flight control computer 202 may control the lift elements 208 based on the configuration airspeed, in lieu of an airspeed measured by sensors 203. For example, when the aircraft is on the ground, the pilot may hold the configuration airspeed constant to prevent activating the powered lift elements 208 during a conventional takeoff or during a landing ground roll. When the aircraft is in the air, the pilot may set a desired configuration airspeed in a powered lift intermediate mode, as described below with reference to FIGS. 8-10. For example, a pilot may set a configuration airspeed in anticipation of a short landing. In some embodiments, the inceptor switch 702 may be a physical switch, button, and/or lever. In some embodiments, the inceptor switch 702 may be a user interface element provided on a display screen or control panel to the pilot. In some embodiments, the inceptor switch 702 may be a processor that may receive a pilot's manual selection and/or voice command requesting a configuration airspeed. The inceptor switch 702 may include any means that allows the pilot to select a configuration airspeed. The inceptor switch 702 may send a signal to a flight control computer 202 and associated controller 703 indicating a configuration airspeed set by the pilot. In some embodiments, the signal may be sent directly from the inceptor switch 702 to the flight control computer 202. In other embodiments, one or more processors, microprocessors, and/or computers may receive an input from the inceptor switch 702 and may provide a signal indicating the request to flight control computer 202. In some embodiments, the inceptor switch does not set an airspeed, but instead sets a proportion of powered lift that may be provided. For example, the inceptor switch may indicate an angle of a powered lift element, a powered lift element rotation speed, and/or power provided by a powered lift element.

Figure 8:
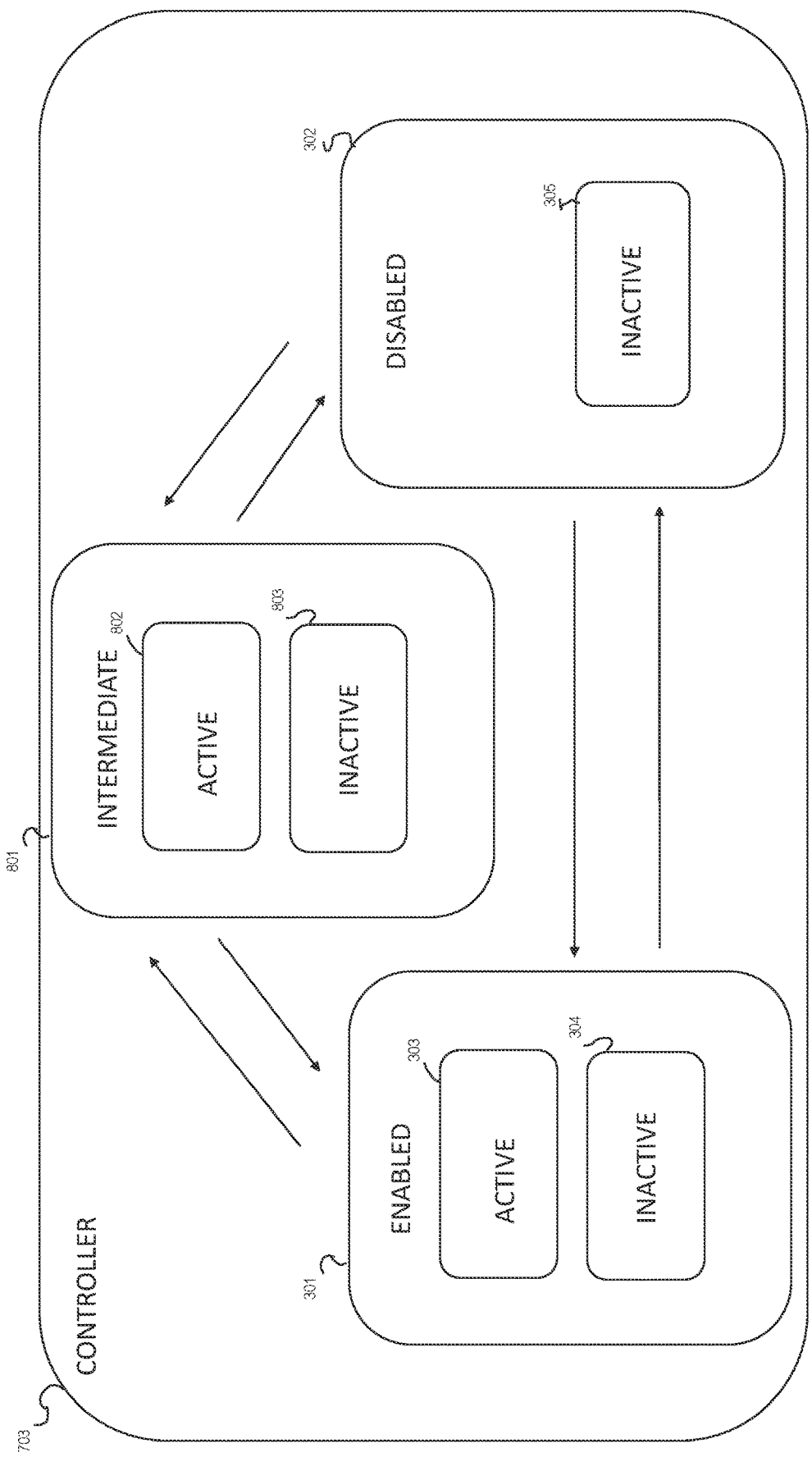
FIG. 8 illustrates another controller, consistent with the embodiments of the present disclosure.

FIG. 8 illustrates controller 703, consistent with embodiments of the present disclosure. As described above, in some embodiments, the controller 703 may be included as part of the flight control computer 202. However, in other embodiments the controller 703 may be located separately from the flight control computer 202. As shown, the controller 703 includes many of the elements of controller 207 in FIG. 3. Controller 703 allows for switching between enabled mode 301 and disabled mode 302. The controller 703 further allows for switching to and from an intermediate mode 801.

In intermediate mode 801, the controller 703 may automatically switch between active state 802 and inactive state 803 based on flight conditions, including the aircraft's airspeed. In intermediate mode 801, inactive state 803 may be the same as inactive state 304 described above with reference to FIG. 3. In some embodiments, active state 802 may be the same as active state 303 described above with reference to FIG. 3. However, in other embodiments, active state 802 may differ from active state 303 by only allowing partial activation of lift elements 208. The active state 802 may only allow a proportion of an aircraft's potential powered lift to be provided. For example, in some embodiments, the powered lift elements may be limited to a set angle (e.g. 35, 50, 60 degrees etc.), measured from the forward thrust configuration (e.g., FIG. 1*a*) towards a lift configuration (e.g., FIG. 1*b*). In some embodiments, the rotation speed or power provided by the powered lift elements 208 may be similarly limited.

In a powered lift intermediate mode 801, the aircraft may switch from an active state 802 to an inactive state 803 when the aircraft's airspeed exceeds a first speed threshold. In a powered lift intermediate mode 801, the aircraft may automatically switch from an inactive state 803 to an active state 802 when the aircraft's airspeed speed drops below a second speed threshold. In some embodiments, the first and second thresholds may be the same as enabled mode 301 first and second speed thresholds described above with reference to FIG. 3, while in other embodiments they may differ. The controller 703 may set the speed thresholds in consideration of load factors based on measurements from the sensors 203, as described above.

Further, in some embodiments, in powered lift intermediate mode 801, the airspeed may be a configuration airspeed set by the pilot through the inceptor switch 702. For example, the pilot may decide to perform a short landing and may set the configuration airspeed at a value below the intermediate mode second threshold. The controller 703 may then switch the aircraft from an inactive state 803 to an active state 802. Therefore, in powered lift intermediate mode 801 the flight control computer 202 may control the powered lift element actuators 204 by sending signals to actuators 204 to allow the aircraft to fly in a powered lift configuration based on the configuration airspeed. However, once the lift elements 208 are determined to be in an orientation corresponding to the configuration airspeed (e.g. 35, 50, 60 degrees etc.), the flight control computer 202 will be prevented from moving the lift elements 208 further towards a lift configuration.

Further, in some embodiments, in powered lift intermediate mode 801, the pilot may set a proportion of powered lift that may be provided. For example, the pilot may use the inceptor switch to set an angle of a powered lift element, a powered lift element rotation speed, and/or power provided by a powered lift element. Therefore, in powered lift intermediate mode 801 the flight control computer 202 may control the powered lift element actuators 204 by sending signals to actuators 204 to allow the aircraft to fly in a powered lift configuration based on the set proportion of powered lift. However, once the lift elements 208 are determined to be at the set proportion of powered lift, the flight control computer 202 will be prevented from moving the lift elements 208 further towards a lift configuration.

In some embodiments, the configuration airspeed or proportion of powered lift set by the pilot in intermediate mode may set a maximum amount of lift support to be provided by the powered lift elements. Once the aircraft airspeed exceeds the intermediate mode first speed threshold, the aircraft may transition to the inactive state 803. For example, the pilot may decide to perform a short takeoff and may set the configuration airspeed at a value below the intermediate mode second threshold or may otherwise set a proportion of powered lift support. The controller 703 may then switch the aircraft from an inactive state 803 to an active state 802. As described above, flight control computer 202 may control the powered lift element actuators 204 by sending signals to actuators 204 to allow the aircraft to fly in a powered lift configuration based on the configuration airspeed or set proportion of powered lift. As the aircraft speed increases and exceeds the intermediate mode first threshold, the aircraft will transition from active state 802 to inactive state 803 and no powered lift will be provided.

FIG. 9a illustrates a flowchart for switching from enabled mode 301 to intermediate mode 801, consistent with embodiments of the present disclosure. At step 901, controller 703 may receive a request through switch 701 requesting an aircraft be switched from a power lift enabled mode 301 to an intermediate mode 801. At step 903, the controller 703 may gather flight sensor information from sensors 203. In some embodiments, the controller 703 may gather this information directly from sensors 203, while in other embodiments, flight sensor information may be stored in a memory and/or database accessible by the controller 703. Information gathered from the flight sensors 203 may include any information necessary to determine whether conditions to switch to intermediate mode are satisfied. In some embodiments, information may be gathered on an aircraft's airspeed. In some embodiments, information may be gathered on the position of a lift element 208 (e.g., whether lift elements are in lift, forward thrust, and/or stowed configuration), and its status (e.g., whether the lift elements are electrically connected, are rotating as intended etc.). In some embodiments, information may be gathered on an aircraft's positioning along its various axes (pitch, roll, yaw) and its movement across those axes. In some embodiments, information may be gathered on an aircraft's altitude and whether its wheels are deployed and/or touching the ground.

At step 905, based on this information, controller 703 may make a determination of whether intermediate mode 801 flight conditions are satisfied and whether the aircraft can be transitioned into intermediate mode 801. FIG. 9b illustrates a table of exemplary conditions under which a switch to intermediate mode 801 may be allowed. In some embodiments, when an aircraft is determined to be in flight based on sensor information received at step 903, intermediate mode 801 may only be allowed if the aircraft satisfies certain in-flight requirements. In-flight requirements may include verifying that an aircraft's airspeed is above a third speed threshold. In some embodiments, the third speed threshold may be the same as the first speed threshold used in an intermediate mode 801 to switch to an inactive state 803. In other embodiments, the third speed threshold may be 1.05× the stall speed. In-flight requirements may include verifying that a flight lift element 208 is at least in an intermediate position. In some embodiments, the intermediate position may be a position equal to or less than 60 degrees from the stowed and/or forward thrust position shown in FIG. 1a. In-flight requirements may include verifying that an aircraft positioning is safe to transition to intermediate mode. In some embodiments, this may include verifying that the orientation of the aircraft along its roll and pitch axes are such that partial winged-flight can be maintained. In some embodiments, this may include verifying that the aircraft is not undergoing a maneuver that would make maintaining partial winged-flight unsafe. For example, the controller 207 may verify whether the aircraft attitude and/or dynamics is outside of the normal flight envelope for the pitch, roll or yaw axes for a given flight condition. Even if one or more of the in-flight requirements are not met, the controller 703 may determine that a switch to intermediate mode 801 may be allowed because the aircraft is determined to be on the ground in a taxi phase of flight or stationary, thereby allowing the pilot to undertake a powered lift short takeoff.

At step 906, if the intermediate mode 801 flight conditions are not met, a notice may be provided to the pilot (e.g., through output device 206) indicating that a switch to intermediate mode 801 is not allowed. In some embodiments, the notice may include details stating which of the one or more flight conditions are not met. For example, in some embodiments the output device 206 may be a display and the notice may state "speed threshold not met", and/or "intermediate powered lift element position not met", and/or "aircraft dynamics cannot support intermediate powered lift". The notice may provide further details on corrections the pilot may make in order for switch to intermediate mode 801 to be allowed.

At step 907, if intermediate mode 801 conditions are met, the controller 703 may provide a notice to the pilot indicating a switch to intermediate mode 801. In some embodiments, a notice may be provided to the pilot indicating they have the option to set the configuration airspeed with the inceptor switch 702. Further, in some embodiments, the controller 703 may send instructions in the form of a signal, command, and/or change of data field to prevent the flight control computer 202 from operating lift elements beyond intermediate mode positioning. For example, the controller 207 may prevent the flight control computer 202 from moving the lift elements 208 into a lift position beyond 60 degrees from a forward thrust configuration. Further, the controller 703 may direct the flight control computer 202 to accept a pilot's configuration airspeed from the inceptor switch 702 to control the lift elements 208.

Figures 10A, 10B:
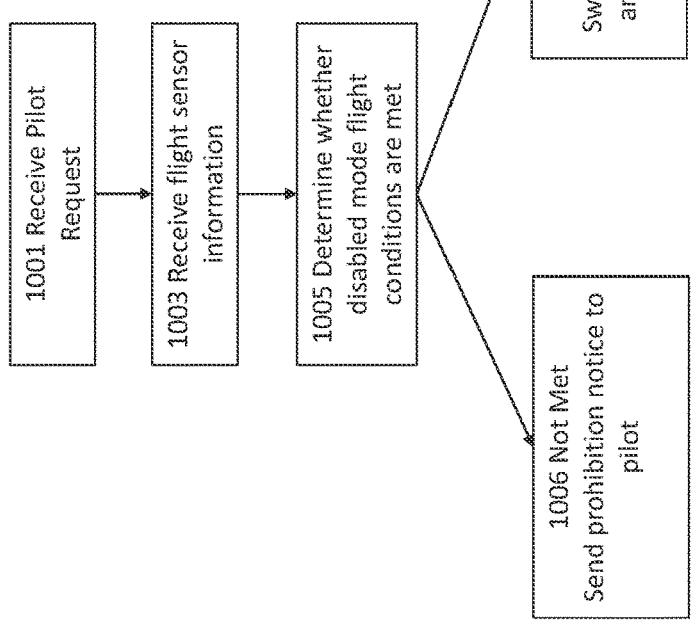
FIG. 10a illustrates a flowchart for switching from intermediate mode to disabled mode, consistent with the embodiments of the present disclosure.
FIG. 10b illustrates a table for when disabled mode may be allowed, consistent with embodiments of the present disclosure.

FIG. 10a illustrates a flowchart for switching from intermediate mode 801 to disabled mode 302, consistent with embodiments of the present disclosure. At step 1001, controller 703 may receive a pilot request through switch 701 requesting an aircraft be switched from an intermediate powered lift mode 801 to a disabled mode 302. At step 1003, the controller 703 may gather flight sensor information from sensors 203. In some embodiments, the controller 703 may gather this information directly from sensors 203, while in other embodiments, flight sensor information may be stored in a memory and/or database accessible by the controller 703. Information gathered from the flight sensors 203 may include any information necessary to determine whether conditions to switch to a disabled mode are satisfied. In some embodiments, information may be gathered on an aircraft's airspeed. In some embodiments, information may be gathered on the position of a lift element 208 (e.g., whether lift elements are in lift, forward thrust, and/or stowed configuration), and its status (e.g., whether the lift elements are electrically connected, are rotating as intended etc.). In some embodiments, information may be gathered on an aircraft's positioning along its various axes (pitch, roll, yaw) and its movement across those axes. In some embodiments, information may be gathered on an aircraft's altitude and whether its wheels are deployed and/or touching the ground.

At step 1005, based on this information, controller 703 may make a determination of whether disabled mode 302 flight conditions are satisfied and whether the aircraft can be transitioned into disabled mode 302. FIG. 10*b* illustrates a table of exemplary conditions under which a switch to disabled mode 302 may be allowed. In some embodiments, when an aircraft is determined to be in flight based on sensor information received at step 1003, a disabled mode may only be allowed if the aircraft satisfies certain in-flight requirements or when lift elements are experiencing an emergency condition. In-flight requirements may include verifying that an aircraft's airspeed is above a third speed threshold. In some embodiments, the third speed threshold may be the same as the first speed threshold used in an intermediate mode 801 to switch to an inactive state 802. In other embodiments, the third speed threshold may be 1.05× the stall speed. In-flight requirements may include verifying that a flight lift element 208 is in a stowed and/or forward thrust position. In some embodiments, this may include verifying that the tilt angle of a lift element 208 matches a stowed and/or forward thrust position. In other embodiments, this may include verifying that the tilt angle of lift element 208 is within a set proximity of its stowed and/or forward thrust position. For example, angle of a lift element 208 may be determined to be within 10 degrees of a stowed and/or forward thrust orientation. In some embodiments, verifying a stowed position may include verifying that the rotation of the rotors is stopped and/or nearly stopped.

In-flight requirements may include verifying that an aircraft positioning is safe to transition to disabled mode 302. In some embodiments, this may include verifying that the orientation of the aircraft along its roll and pitch axes are such that winged-flight can be maintained. In some embodiments, this may include verifying that the aircraft is not undergoing a maneuver that would make maintaining winged-flight unsafe. For example, the controller 703 may verify whether the aircraft attitude and/or dynamics is outside of the normal flight envelope for the pitch, roll or yaw axes for a given flight condition. Even if one or more of the in-flight requirements are not met, the controller 703 may determine that a switch to disabled mode 302 may be allowed because the aircraft is determined to be on the ground in a taxi phase of flight or stationary, thereby allowing the pilot to undertake a winged flight takeoff. Additionally, even if one or more of the in-flight requirements are not met, a switch to disabled mode 302 may be allowed when the aircraft is experiencing a lift element emergency. In some embodiments, a lift element emergency may be detected when the lift elements are operating in a condition that may compromise the controllability of the aircraft. In some embodiments, a lift element emergency may be detected by a malfunction (e.g., power failure and/or lack of rotation) to a set number of lift elements 208 on a certain side of the aircraft (e.g., if 2 of 3 lift elements on a left side of the aircraft are not rotating). In some embodiments, a lift element emergency may be detected based on the movement of an aircraft in an unusual manner. In some embodiments, even if an aircraft is experiencing a lift element emergency as described above, a switch to disabled mode 302 may be prevented if the aircraft airspeed is below the stall speed.

At step 1006, if the disabled mode 302 flight conditions are not met, a notice may be provided to the pilot (e.g., through output device 206) indicating that a switch to disabled mode is not allowed. In some embodiments, the notice may include details stating which of the one or more flight conditions are not met. For example, in some embodiments the output device 206 may be a display and the notice may state "speed threshold not met", and/or "stowed position not met", and/or "aircraft dynamics cannot support winged-flight". The notice may provide further details on corrections the pilot may make in order for switch to disabled mode 302 to be allowed.

At step 1007, if disabled mode 302 conditions are met, controller 703 may provide a notice to the pilot indicating a switch to disabled mode 302. Further, in some embodiments, the controller 703 may send instructions in the form of a signal, command, and/or change of data field to prevent the flight control computer 202 from operating lift elements in a manner that provides lift to the aircraft. In some embodiments, this prohibition may be performed by changing the circuitry, through operation of a switch, transistor, etc. Therefore, even as the aircraft airspeed drops below the second threshold speed (i.e. an airspeed in intermediate mode 801 that activates lift elements 208), the flight control computer 202 may be prohibited from sending lift signals to lift element actuators 208. Thus, the winged flight of the aircraft may be continued with no disturbance or intervention from the lift elements 208.

Figure 11:
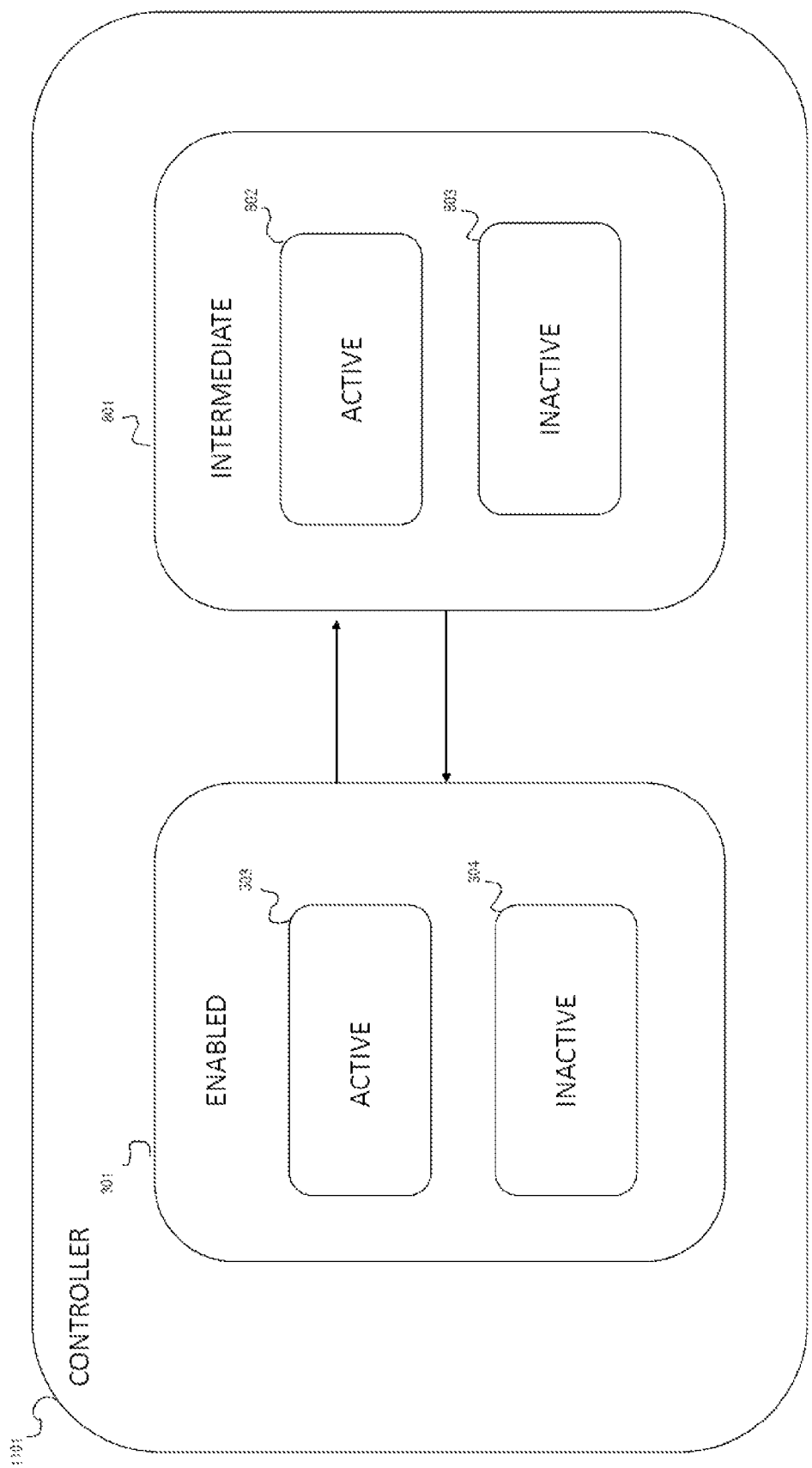
FIG. 11 illustrates a controller, consistent with the embodiments of the present disclosure.

FIG. 11 illustrates a controller 1101, consistent with embodiments of the present disclosure. As described above, in some embodiments, the controller 1101 may be included as part of the flight control computer 202. However, in other embodiments the controller 1101 may be located separately from the flight control computer 202. The controller 1101 may switch between an enabled mode 301 and an intermediate mode 801, described above with reference to FIG. 8. In some embodiments, in intermediate mode 801, the pilot may use an inceptor switch 702 to set a configuration airspeed and/or a proportion of powered lift to be provided by the aircraft. In other embodiments, the intermediate mode 801 may have a stored configuration airspeed and/or proportion of powered lift to be provided by the aircraft.

In some embodiments, controller 1101 may be installed in an aircraft that receives insufficient lift through its wings and other static lifting surfaces. Therefore, the aircraft is unable to fly in a disabled mode with no powered lift support. However, the aircraft may be capable of performing short takeoffs and landings. The pilot may want to limit the amount of powered lift support during these stages of flight or during other stages of flight. By switching to intermediate mode, the pilot may limit the activation of the powered lift elements 208 and avoid unwanted interference by the powered lift elements.

Further, as described above with reference to FIG. 9*a*, controller 1101 may determine whether this transition is permitted based on a variety of requirements. In-flight requirements may include verifying that an airspeed threshold is met. In some embodiments, the airspeed threshold may be the same as the third speed threshold described with reference to FIG. 9a, while in other embodiments it may be different. The airspeed threshold may be defined to comply with aircraft geometric constraints and/or runway configuration (e.g. length of a runway). In-flight requirements may further include verifying that flight lift elements 208 are at least in an intermediate position and that the orientation of the aircraft permits a transition to intermediate mode. Even if one or more of the in-flight requirements are not met, the controller 1101 may determine that a switch to intermediate mode 801 may be allowed because the aircraft is determined to be on the ground in a taxi phase of flight or stationary, thereby allowing the pilot to undertake a powered lift short takeoff.

While the above example embodiments use aircraft airspeed thresholds to determine when to switch between states and modes, the invention is not so limited. For example, in some embodiments, dynamic pressure thresholds may be used to determine switches between states and modes. In one embodiment, a dynamic pressure threshold may be used to determine a switch from a powered-lift active state to a powered-lift inactive state. The pressure threshold may be set at a threshold where the aircraft generates sufficient lift from the wings or other static lifting surfaces and no longer requires powered lift. Further, throughout the disclosure "meets" and "satisfies" are used interchangeably.

FIG. 12 illustrates a simulator system, consistent with embodiments of the present disclosure. Device 1200 may include a computer, processor, and/or microprocessor and may further include a memory to store one or more flight simulator programs. The one or more flight simulator programs may store instructions to simulate flight conditions on a display 1204 based on user input (e.g. via a user input device). Flight conditions may include a simulated speed, acceleration, ascent, decent, and/or positioning (roll, pitch, yaw). In some embodiments, flight conditions may be simulated by the movement of display screen objects (e.g. landscape, buildings etc.) relative to a displayed aircraft and/or pilot cockpit. In some embodiments, the one or more flight simulator programs may store instructions to simulate flight conditions by controlling the movement and/or vibration of a user's chair and/or a user's input devices.

In some embodiments, user input may include runway conditions, weather conditions, wind conditions, altitude, type of aircraft, aircraft characteristics, and/or simulated emergencies. In some embodiments, user input device(s) may include inceptor(s), throttle(s), thumb inceptor(s), switch(es), and/or button(s). These input devices may be located as part of device 1200 or may communicate with device 1200 through wired or wireless communication. In some embodiments, an input switch 1202 may allow a user to select a desired mode of operation. For example, switch 1202 may allow the mode selection described with reference to switch 205 in FIG. 2-FIG. 6(a) and/or may allow the mode selection described with reference to switch 701 in FIG. 7-FIG. 11. The input switch may be any type described in the above embodiments (e.g., a button, a switch, a lever, a graphic user interface, a display screen, or a voice input device). Further, device 1204 or another output device may provide any of the notices described in the above embodiments. In some embodiments, the notices are provided on a separate output device which may be any type described in the above embodiments (e.g., display, lights, touch screen, haptics device, virtual/augmented reality display, or speakers).

As described above with reference to FIG. 2-FIG. 11, based on the selected mode of operation and the flight conditions, powered lift of the aircraft is controlled and notices may be provided. In the simulator system shown in FIG. 12, device 1200 may store any information relevant to making the determinations described above with reference to FIG. 2-FIG. 11. For example, device 1200 may store information on the simulated airspeed, simulated aircraft orientation and/or positioning, simulated powered lift element position (e.g., stored or a tilt degree), simulated powered lift element operation (e.g. providing thrust), simulated battery condition (e.g. a state of charge or state of energy), simulated failure, and/or simulated emergencies. Based on this stored information and input receive on switch 1202, device 1200 may perform any process described herein and may simulate the control of the powered lift elements and provide notices to a user. For example, in some embodiments, device 1200 may simulate control of the powered lift elements on display 1204 by showing a changed orientation of a powered lift element and/or by simulating flight conditions corresponding to an orientation of the powered lift elements (e.g. adjusting simulated ascent, simulated descent, simulated aircraft orientation etc.). For example, in some embodiments, device 1200 may provide notices on a display 1204 and/or a different display in communication with the device 1200.

The foregoing description has been presented for purposes of illustration. It is not exhaustive and does not limit the disclosure to the precise forms or embodiments disclosed. Modifications and adaptations of the disclosure will be apparent to those skilled in the art from consideration of the specification and practice of the disclosed embodiments.

CLAUSES

The embodiments may further be described using the following clauses:

Clause set A: 1. A control system for a powered lift aircraft, the system comprising: a pilot input device; at least one powered lift element configured to provide powered lift support to the aircraft; and at least one processor configured to: receive, from the pilot input device, an input indicative of one of a powered lift enabled mode or a powered lift disabled mode; and control the at least one powered lift element to operate the aircraft in a selected one of the powered lift enabled mode or the powered lift disabled mode based on the received input, wherein, in the powered lift enabled mode, the at least one processor is configured to control the at least one powered lift element based on a state of the aircraft; and wherein, in the powered lift disabled mode, the at least one processor is configured to control the at least one powered lift element to disable powered lift.

2. The control system of clause A1, wherein the at least one powered lift element comprises a rotor or a proprotor.

3. The control system of clause A1 or A2, wherein the pilot input device comprises at least one of a button, a switch, a lever, a graphic user interface, a display screen, or a voice input device.

4. The control system of any one of clauses A1-A3, wherein the state of the aircraft comprises an airspeed of the aircraft.

5. The control system of clause A4, wherein controlling the at least one powered lift element based on the state of the aircraft further comprises: when aircraft's airspeed is above a first threshold, controlling the at least one powered lift element to operate the aircraft in the powered lift enabled mode; and when the aircraft's airspeed is below a second threshold, controlling the at least one powered lift element to operate the aircraft in the powered lift disabled mode.

6. The control system of clause A5, wherein the second threshold is less than the first threshold.

7. The control system of any one of clauses A1-A6, wherein when the received input is indicative of the powered lift disabled mode, the at least one processor is further configured to: determine whether a condition for switching to the powered lift disabled mode is satisfied.

8. The control system of clause A7, wherein the condition includes at least one of an aircraft airspeed being above a threshold, the at least one powered lift element being in a stowed position, the at least one powered lift element being in a forward thrust position, the orientation of the aircraft enabling the aircraft to maintain winged flight, or the at least one powered lift element experiencing a failure.

9. The control system of clause A7 or A8, further comprising: an output device; wherein the at least one processor is further configured to: provide an indication to the pilot through the output device indicating that switching to the powered lift disabled mode is not permitted upon determining that the condition for switching to the powered lift disabled mode is not satisfied.

10. The control system of clause A9, wherein the indication includes the condition that was not satisfied.

11. The control system of any one of clauses A1-A10, wherein the at least one processor is further configured to:
determine whether a condition for switching to the powered lift enabled mode is satisfied upon receiving the input indicative of the powered lift enabled mode, wherein the condition for switching to the powered lift enabled mode includes at least one of: the at least one powered lift element is not experiencing a failure or the at least one powered lift element satisfies a battery condition.

12. The control system of clause A11, wherein the condition for switching to the powered lift enabled mode includes the at least one powered lift element satisfying the battery condition and wherein the battery condition includes a state of charge being above a threshold level.

13. The control system of any one of clauses A1-A12, further comprising: an output device; wherein the at least one processor is further configured to provide an indication to the pilot through the output device indicating that switching to powered lift disabled mode is available upon determining that a condition for switching to the powered lift disabled mode is satisfied.

14. The control system of clause A13, wherein the indication includes at least one of: a displaying of text, a turning on of a light, a changing of a light color, an audible notification, or a haptic notification.

15. A powered lift aircraft comprising the control system of any of one of clauses A1-A14.

16. The powered lift aircraft of clause A15, wherein the powered lift aircraft is at least one of: conventional takeoff and landing (CTOL) aircraft, a short takeoff and landing (STOL) aircraft, a vertical takeoff and landing (VTOL) aircraft, a rotor craft, a tiltrotor aircraft, or a tiltwing aircraft.

17. A method of controlling a powered lift aircraft by at least one processor, the method comprising: receiving from a pilot input device, an input indicative of one of a powered lift enabled mode or a powered lift disabled mode; and controlling the at least one powered lift element to operate the aircraft in a selected one of the powered lift enabled mode or the powered lift disabled mode based on the received input, wherein in the powered lift enabled mode, the at least one powered lift element is controlled based on a state of the aircraft; and wherein in the powered lift disabled mode, the at least one powered lift element is controlled to disable powered lift.

18. The method of clause A17, wherein the at least one powered lift element comprises a rotor or a proprotor.

19. The method of clauses A17 or A18, wherein the pilot input device comprises at least one of a button, a switch, a lever, a graphic user interface, a display screen, or a voice input device.

20. The method of any one of clauses A17-A19, wherein the state of the aircraft comprises an airspeed of the aircraft.

21. The method of clause A20, wherein controlling the at least one powered lift element based on the state of the aircraft further comprises: when aircraft's airspeed is above a first threshold, controlling the at least one powered lift element to operate the aircraft in the powered lift enabled mode; and when the aircraft's airspeed is below a second threshold, controlling the at least one powered lift element to operate the aircraft in the powered lift disabled mode.

22. The method of clause A21, wherein the second threshold is less than the first threshold.

23. The method of any one of clauses A17-A22, wherein when the received input is indicative of the powered lift disabled mode, the method further comprises: determining whether a condition for switching to the powered lift disabled mode is satisfied.

24. The method of clause A23, wherein the condition includes at least one of an aircraft airspeed being above a threshold, the at least one powered lift element being in a stowed position, the at least one powered lift element being in a forward thrust position, the orientation of the aircraft enabling the aircraft to maintain winged flight, or the at least one powered lift element experiencing a failure.

25. The method of clauses A23 or A24, further comprising: providing an indication to the pilot through an output device indicating that switching to the powered lift disabled mode is not permitted upon determining that the condition for switching to the powered lift disabled mode is not satisfied.

26. The method of clause A25, wherein the indication includes the condition that was not satisfied.

27. The method of any one of clauses A17-A26, further comprising: determining whether a condition for switching to the powered lift enabled mode is satisfied upon receiving the input indicative of the powered lift enabled mode, wherein the condition for switching to the powered lift enabled mode includes at least one of the at least one powered lift element is not experiencing a failure or the at least one powered lift element satisfies a battery condition.

28. The method of clause A27, wherein the condition for switching to the powered lift enabled mode includes the at least one powered lift element satisfying the battery condition and wherein the battery condition includes a state of charge being above a threshold level.

29. The method of any one of clauses A17-A28, further comprising: providing an indication to the pilot through an output device indicating that switching to powered lift disabled mode is available upon determining that a condition for switching to the powered lift disabled mode is satisfied.

30. The method of clause A29, wherein the indication includes at least one of: a displaying of text, a turning on of a light, a changing of a light color, an audible notification, or a haptic notification.

31. A powered lift aircraft configured to perform the method of any one of clauses A17-A30.

32. The powered lift aircraft of clause A31, wherein the powered lift aircraft is at least one of: conventional takeoff and landing (CTOL) aircraft, a short takeoff and landing (STOL) aircraft, a vertical takeoff and landing (VTOL) aircraft, a rotor craft, a tiltrotor aircraft, or a tiltwing aircraft.

33. A computer-readable medium storing instructions which, when executed by at least one processor cause the at least one processor to perform the method of any one of clauses A17-A30.

The embodiments may further be described using the following clauses:

Clause set B: 1. A control system for a powered lift aircraft, the system comprising: a first pilot input device; a second pilot input device; at least one powered lift element configured to provide powered lift support to the aircraft; and at least one processor configured to: receive, from the first pilot input device, an input indicative of one of a powered lift enabled mode, powered lift intermediate mode, or a powered lift disabled mode; and control the at least one powered lift element to operate the aircraft in a selected one of the powered lift enabled mode, the powered lift intermediate mode, or the powered lift disabled mode based on the received input, wherein in the powered lift enabled mode, the at least one processor is configured to control the at least one powered lift element based on a state of the aircraft; wherein in the powered lift intermediate mode, the at least one processor is configured to control the at least one powered lift element based on input received at the second pilot input device; and wherein in the powered lift disabled mode, the at least one processor is configured to control the at least one powered lift element to disable powered lift.

2. The control system of clause B1, wherein the at least one powered lift element comprises a rotor or a proprotor.

3. The control system of clauses B1 or B2, wherein the first pilot input device comprises at least one of a button, a switch, a lever, a graphic user interface, a display screen, or a voice input device.

4. The control system of any one of clauses B1-B3, wherein the state of the aircraft comprises an airspeed of the aircraft.

5. The control system of clause B4, wherein controlling the at least one powered lift element based on the state of the aircraft further comprises: when aircraft's airspeed is above a first threshold, controlling the at least one powered lift element to operate the aircraft in the powered lift enabled mode; and when the aircraft's airspeed is below a second threshold, controlling the at least one powered lift element to operate the aircraft in the powered lift disabled mode.

6. The control system of clause B5, wherein the second threshold is less than the first threshold.

7. The control system of any one of clauses B1-B6, wherein when the received input is indicative of the powered lift disabled mode, the at least one processor is further configured to: determine whether a condition for switching to the powered lift disabled mode is satisfied.

8. The control system of clause B7, wherein the condition includes at least one of an aircraft airspeed being above a threshold, the at least one powered lift element being in a stowed position, the at least one powered lift element being in a forward thrust position, the orientation of the aircraft enabling the aircraft to maintain winged flight, or the at least one powered lift element experiencing a failure.

9. The control system of clauses B7 or B8, further comprising: an output device; wherein the at least one processor is further configured to: provide an indication to the pilot through the output device indicating that switching to the powered lift disabled mode is not permitted upon determining that the condition for switching to the powered lift disabled mode is not satisfied.

10. The control system of clause B9, wherein the indication includes the condition that was not satisfied.

11. The control system of any one of clauses B1-B10, wherein the at least one processor is further configured to: determine whether a condition for switching to the powered lift enabled mode is satisfied upon receiving the input indicative of the powered lift enabled mode, wherein the condition for switching to the powered lift enabled mode includes at least one of the at least one powered lift element is not experiencing a failure or the at least one powered lift element satisfies a battery condition.

12. The control system of clause B11, wherein the condition for switching to the powered lift enabled mode includes the at least one powered lift element satisfying the battery condition and wherein the battery condition includes a state of charge being above a threshold level.

13. The control system of any one of clauses B1-B12, further comprising: an output device; wherein the at least one processor is further configured to provide an indication to the pilot through the output device indicating that switching to powered lift disabled mode is available upon determining that a condition for switching to the powered lift disabled mode is satisfied.

14. The control system of clause B13, wherein the indication includes at least one of: a displaying of text, a turning on of a light, a changing of a light color, an audible notification, or a haptic notification.

15. The control system of clause B1, wherein when the received input is indicative of the powered lift intermediate mode, the at least one processor is further configured to: determine whether a condition for switching to the powered lift intermediate mode is satisfied.

16. The control system of clause B15, wherein the condition includes at least one of an aircraft airspeed being above a threshold, the at least one powered lift element being in an intermediate position, or the orientation of the aircraft enabling the aircraft to maintain winged flight in intermediate mode.

17. The control system of clause B15 or B16, further comprising: an output device; wherein the at least one processor is further configured to: provide an indication to the pilot through the output device indicating that switching to the powered lift intermediate mode is not permitted upon determining that the condition for switching to the powered lift intermediate mode is not satisfied.

18. A powered lift aircraft comprising the control system of any of one of clauses B1-B17.

19. The powered lift aircraft of clause B18, wherein the powered lift aircraft is at least one of: conventional takeoff and landing (CTOL) aircraft, a short takeoff and landing (STOL) aircraft, a vertical takeoff and landing (VTOL) aircraft, a rotor craft, a tiltrotor aircraft, or a tiltwing aircraft.

17. A method of controlling a powered lift aircraft by at least one processor, the method comprising: receiving, from a pilot input device, an input indicative of one of a powered lift enabled mode, powered lift intermediate mode, or a powered lift disabled mode; and controlling the at least one powered lift element to operate the aircraft in a selected one of the powered lift enabled mode, the powered lift intermediate mode, or the powered lift disabled mode based on the received input, wherein in the powered lift enabled mode, the at least one powered lift element is controlled based on a state of the aircraft; wherein in the powered lift intermediate mode, the at least one powered lift element is controlled based on input received at the second pilot input device; and wherein in the powered lift disabled mode, the at least one powered lift element is controlled to disable powered lift.

18. The method of clause B17, wherein the at least one powered lift element comprises a rotor or a proprotor.

19. The method of clauses B17 or B18, wherein the pilot input device comprises at least one of a button, a switch, a lever, a graphic user interface, a display screen, or a voice input device.

20. The method of any one of clauses B17-B19, wherein the state of the aircraft comprises an airspeed of the aircraft.

21. The method of clause B20, wherein controlling the at least one powered lift element based on the state of the aircraft further comprises: when aircraft's airspeed is above a first threshold, controlling the at least one powered lift element to operate the aircraft in the powered lift enabled mode; and when the aircraft's airspeed is below a second threshold, controlling the at least one powered lift element to operate the aircraft in the powered lift disabled mode.

22. The method of clause B21, wherein the second threshold is less than the first threshold.

23. The method of any one of clauses B17-B22, wherein when the received input is indicative of the powered lift disabled mode, the method further comprises: determining whether a condition for switching to the powered lift disabled mode is satisfied.

24. The method of clause B23, wherein the condition includes at least one of an aircraft airspeed being above a threshold, the at least one powered lift element being in a stowed position, the at least one powered lift element being in a forward thrust position, the orientation of the aircraft enabling the aircraft to maintain winged flight, or the at least one powered lift element experiencing a failure.

25. The method of clauses B23 or B24, further comprising: providing an indication to the pilot through an output device indicating that switching to the powered lift disabled mode is not permitted upon determining that the condition for switching to the powered lift disabled mode is not satisfied.

26. The method of clause B25, wherein the indication includes the condition that was not satisfied.

27. The method of any one of clauses B17-B26, further comprising: determining whether a condition for switching to the powered lift enabled mode is satisfied upon receiving the input indicative of the powered lift enabled mode, wherein the condition for switching to the powered lift enabled mode includes at least one of the at least one powered lift element is not experiencing a failure or the at least one powered lift element satisfies a battery condition.

28. The method of clause B27, wherein the condition for switching to the powered lift enabled mode includes the at least one powered lift element satisfying the battery condition and wherein the battery condition includes a state of charge being above a threshold level.

29. The method of any one of clauses B17-B28, further comprising: providing an indication to the pilot through an output device indicating that switching to powered lift disabled mode is available upon determining that a condition for switching to the powered lift disabled mode is satisfied.

30. The method of clause B29, wherein the indication includes at least one of: a displaying of text, a turning on of a light, a changing of a light color, an audible notification, or a haptic notification.

31. The method of clause B17, wherein when the received input is indicative of the powered lift intermediate mode, the at least one processor is further configured to: determine whether a condition for switching to the powered lift intermediate mode is satisfied.

32. The method of clause B32, wherein the condition includes at least one of an aircraft airspeed being above a threshold, the at least one powered lift element being in an intermediate position, or the orientation of the aircraft enabling the aircraft to maintain flight in intermediate mode.

33. The method clause B31 or B32, further comprising: an output device; wherein the at least one processor is further configured to: provide an indication to the pilot through the output device indicating that switching to the powered lift intermediate mode is not permitted upon determining that the condition for switching to the powered lift intermediate mode is not satisfied.

34. A powered lift aircraft configured to perform the method of any one of clauses B17-B33.

35. The powered lift aircraft of clause B34, wherein the powered lift aircraft is at least one of: conventional takeoff and landing (CTOL) aircraft, a short takeoff and landing (STOL) aircraft, a vertical takeoff and landing (VTOL) aircraft, a rotor craft, a tiltrotor aircraft, or a tiltwing aircraft.

33. A computer-readable medium storing instructions which, when executed by at least one processor cause the at least one processor to perform the method of any one of clauses B17-B32.

The embodiments may further be described using the following clauses:

Clause set C: A control system for a powered lift aircraft, the system comprising: a first pilot input device; a second pilot input device; at least one powered lift element configured to provide powered lift support to the aircraft; and at least one processor configured to: receive, from the first pilot input device, an input indicative of one of a powered lift enabled mode or a powered lift intermediate mode; and control the at least one powered lift element to operate the aircraft in a selected one of the powered lift enabled mode or the powered lift intermediate mode, wherein in the powered lift enabled mode, the at least one processor is configured to control the at least one powered lift element based on a state of the aircraft; and wherein in the powered lift intermediate mode, the at least one processor is configured to control the at least one powered lift element based on input received at the second pilot input device;

2. The control system of clause C1, wherein the at least one powered lift element comprises a rotor or a proprotor.

3. The control system of clauses C1 or C2, wherein the first pilot input device comprises at least one of a button, a switch, a lever, a graphic user interface, a display screen, or a voice input device.

4. The control system of any one of clauses C1-C3, wherein the state of the aircraft comprises an airspeed of the aircraft.

5. The control system of clause C4, wherein controlling the at least one powered lift element based on the state of the aircraft further comprises: when aircraft's airspeed is above a first threshold, controlling the at least one powered lift element to operate the aircraft in the powered lift enabled mode; and when the aircraft's airspeed is below a second threshold, controlling the at least one powered lift element to operate the aircraft in a powered lift disabled mode.

6. The control system of clause C5, wherein the second threshold is less than the first threshold.

7. The control system of any one of clauses C1-C6, wherein when the received input is indicative of the powered lift intermediate mode, the at least one processor is further configured to: determine whether a condition for switching to the powered lift intermediate mode is satisfied.

8. The control system of clause C7, wherein the condition includes at least one of an aircraft airspeed being above a threshold, the at least one powered lift element being in an intermediate position, or the orientation of the aircraft enabling the aircraft to maintain winged flight in intermediate mode.

9. The control system of clauses C7 or C8, further comprising: an output device; wherein the at least one processor is further configured to: provide an indication to the pilot through the output device indicating that switching to the powered lift intermediate mode is not permitted upon determining that the condition for switching to the powered lift intermediate mode is not satisfied.

10. The control system of clause C9, wherein the indication includes the condition that was not satisfied.

11. The control system of any one of clauses C1-C10, wherein the at least one processor is further configured to: determine whether a condition for switching to the powered lift enabled mode is satisfied upon receiving the input indicative of the powered lift enabled mode, wherein the condition for switching to the powered lift enabled mode includes at least one of the at least one powered lift element is not experiencing a failure or the at least one powered lift element satisfies a battery condition.

12. The control system of clause C11, wherein the condition for switching to the powered lift enabled mode includes the at least one powered lift element satisfying the battery condition and wherein the battery condition includes a state of charge being above a threshold level.

13. The control system of any one of clauses C1-C12, further comprising: an output device; wherein the at least one processor is further configured to provide an indication to the pilot through the output device indicating that switching to powered lift intermediate mode is available upon determining that a condition for switching to the powered lift intermediate mode is satisfied.

14. The control system of clause C13, wherein the indication includes at least one of: a displaying of text, a turning on of a light, a changing of a light color, an audible notification, or a haptic notification.

15. A powered lift aircraft comprising the control system of any of one of clauses C1-C14.

16. The powered lift aircraft of clause C15, wherein the powered lift aircraft is at least one of: conventional takeoff and landing (CTOL) aircraft, a short takeoff and landing (STOL) aircraft, a vertical takeoff and landing (VTOL) aircraft, a rotor craft, a tiltrotor aircraft, or a tiltwing aircraft.

17. A method of controlling a powered lift aircraft by at least one processor, the method comprising: receiving from a first pilot input device, an input indicative of one of a powered lift enabled mode or a powered lift intermediate mode; and controlling at least one powered lift element to operate the aircraft in a selected one of the powered lift enabled mode or the powered lift intermediate mode, wherein in the powered lift enabled mode, the at least one powered lift element is controlled based on a state of the aircraft; and wherein in the powered lift intermediate mode the at least one powered lift element is controlled based on input received at a second pilot input device;

18. The method of clause C17, wherein the at least one powered lift element comprises a rotor or a proprotor.

19. The method of clauses C17 or C18, wherein the first pilot input device comprises at least one of a button, a switch, a lever, a graphic user interface, a display screen, or a voice input device.

20. The method of any one of clauses C17-C19, wherein the state of the aircraft comprises an airspeed of the aircraft.

21. The method of clause C20, wherein controlling the at least one powered lift element based on the state of the aircraft further comprises: when aircraft's airspeed is above a first threshold, controlling the at least one powered lift element to operate the aircraft in the powered lift enabled mode; and when the aircraft's airspeed is below a second threshold, controlling the at least one powered lift element to operate the aircraft in a powered lift disabled mode.

22. The method of clause C21, wherein the second threshold is less than the first threshold.

23. The method of any one of clauses C17-C22, wherein when the received input is indicative of the powered lift intermediate mode, the method further comprises: determining whether a condition for switching to the powered lift intermediate mode is satisfied.

24. The method of clause C23, wherein the condition includes at least one of an aircraft airspeed being above a threshold, the at least one powered lift element being in an intermediate position, or the orientation of the aircraft enabling the aircraft to maintain winged flight in intermediate mode.

25. The method of clauses C23 or C24, further comprising: providing an indication to the pilot through an output device indicating that switching to the powered lift intermediate mode is not permitted upon determining that the condition for switching to the powered lift intermediate mode is not satisfied.

26. The method of clause C25, wherein the indication includes the condition that was not satisfied.

27. The method of any one of clauses C17-C26, further comprising: determining whether a condition for switching to the powered lift enabled mode is satisfied upon receiving the input indicative of the powered lift enabled mode, wherein the condition for switching to the powered lift enabled mode includes at least one of the at least one powered lift element is not experiencing a failure or the at least one powered lift element satisfies a battery condition.

28. The method of clause C27, wherein the condition for switching to the powered lift enabled mode includes the at least one powered lift element satisfying the battery condition and wherein the battery condition includes a state of charge being above a threshold level.

29. The method of any one of clauses C17-C28, further comprising: providing an indication to the pilot through an output device indicating that switching to powered lift intermediate mode is available upon determining that a condition for switching to the powered lift intermediate mode is satisfied.

30. The method of clause C29, wherein the indication includes at least one of: a displaying of text, a turning on of a light, a changing of a light color, an audible notification, or a haptic notification.

31. A powered lift aircraft configured to perform the method of any one of clauses C17-C30.

32. The powered lift aircraft of clause C31, wherein the powered lift aircraft is at least one of: conventional takeoff and landing (CTOL) aircraft, a short takeoff and landing (STOL) aircraft, a vertical takeoff and landing (VTOL) aircraft, a rotor craft, a tiltrotor aircraft, or a tiltwing aircraft.

33. A computer-readable medium storing instructions which, when executed by at least one processor cause the at least one processor to perform the method of any one of clauses C17-C30.

Clause Set D: 1. A simulator system for a powered lift aircraft, the system comprising: a user input device; at least one processor configured to: receive, from the user input device, an input indicative of one of a powered lift enabled mode or a powered lift disabled mode; and simulate operation of the aircraft in a selected one of the powered lift enabled mode or the powered lift disabled mode based on the received input, wherein in the powered lift enabled mode, the at least one processor is configured to simulate powered lift based on a stored state of the aircraft; and wherein in the powered lift disabled mode, the at least one processor is configured to simulate disabling the powered lift; wherein simulating the operation of the aircraft comprises at least one of: controlling the movement of objects on a display screen or controlling the positioning of objects on a display screen.

2. The simulator system of Clause D1, wherein the user input device comprises at least one of a button, a switch, a lever, a graphic user interface, a display screen, or a voice input device.

3. The simulator system of Clause D1 or D2, wherein the stored state of the aircraft comprises a stored simulated airspeed of the aircraft.

4. The simulator system of any one of Clauses D1-D3, wherein simulating powered lift based on a stored state of the aircraft comprises:
when aircraft's stored simulated airspeed is above a first threshold, simulating operation of at least one powered lift element of the aircraft; and
when the aircraft's stored simulated airspeed is below a second threshold, not simulating operation of the at least one powered lift element of the aircraft.

5. The simulator system of Clause D4, wherein the second threshold is less than the first threshold.

6. The simulator system of any one of Clauses D1-D5, wherein when the received input is indicative of the powered lift disabled mode, the at least one processor is further configured to determine whether a condition for switching to the powered lift disabled mode is satisfied.

7. The simulator system of Clause D6, wherein the condition includes at least one of a stored simulated aircraft airspeed being above a threshold, a stored simulated position of at least one powered lift element being in a stowed position, a stored simulated position the at least one powered lift element being in a forward thrust position, the simulated orientation of the aircraft enabling the aircraft to maintain winged flight, or the at least one powered lift element experiencing a simulated failure.

8. The simulator system of Clause D7, wherein the at least one processor is further configured to provide an indication to the user through an output device indicating that switching to the powered lift disabled mode is not permitted upon determining that the at least one condition for switching to the powered lift disabled mode is not satisfied.

9. The simulator system of Clause D8, wherein the indication includes the at least one condition that was not satisfied.

10. The simulator system of any one of Clauses D1-D9, wherein the at least one processor is further configured to:
determine whether a condition for switching to the powered lift enabled mode is satisfied upon receiving the input indicative of the powered lift enabled mode,
wherein the condition for switching to the powered lift enabled mode includes at least one powered lift element is not experiencing a simulated failure or the at least one powered lift element satisfies a simulated battery condition.

11. The simulator system of Clause D10, wherein the condition for switching to the powered lift enabled mode includes the at least one powered lift element satisfying the battery condition and wherein the battery condition includes a state of charge being above a threshold level.

12. The simulator system of any one of Clauses D1-D11, wherein the at least one processor is further configured to:
provide an indication to the user through an output device indicating that switching to powered lift disabled mode is available upon determining that a condition for switching to the powered lift disabled mode is satisfied.

13. The simulator system of Clause D12, wherein the indication includes at least one of: a displaying of text, a turning on of a light, a changing of a light color, an audible notification, or a haptic notification.

The invention claimed is:

1. A control system for a powered lift aircraft, the system comprising:
a first pilot input device;
at least one powered lift element configured to provide powered lift support to the aircraft; and
at least one processor configured to:
receive, from the first pilot input device, an input indicative of one of a powered lift enabled mode or a powered lift disabled mode; and
control the at least one powered lift element to operate the aircraft in a selected one of the powered lift enabled mode or the powered lift disabled mode based on the received input,
wherein, in the powered lift enabled mode, the at least one processor is configured to control the at least one powered lift element based on a state of the aircraft; and
wherein, in the powered lift disabled mode, the at least one processor is configured to control the at least one powered lift element to disable powered lift.

2. The control system of claim 1, wherein the at least one powered lift element comprises a rotor or a proprotor.

3. The control system of claim 1, wherein the first pilot input device comprises at least one of a button, a switch, a lever, a graphic user interface, a display screen, or a voice input device.

4. The control system of claim 1, wherein the state of the aircraft comprises an airspeed of the aircraft.

5. The control system of claim 4, wherein controlling the at least one powered lift element based on the state of the aircraft further comprises:
when aircraft's airspeed is above a first threshold, controlling the at least one powered lift element to operate the aircraft in the powered lift enabled mode; and
when the aircraft's airspeed is below a second threshold, controlling the at least one powered lift element to operate the aircraft in the powered lift disabled mode.

6. The control system of claim 5, wherein the second threshold is less than the first threshold.

7. The control system claim 1, wherein when the received input is indicative of the powered lift disabled mode, the at least one processor is further configured to:
determine whether a condition for switching to the powered lift disabled mode is satisfied.

8. The control system of claim 7, wherein the condition includes at least one of an aircraft airspeed being above a threshold, the at least one powered lift element being in a stowed position, the at least one powered lift element being in a forward thrust position, the orientation of the aircraft enabling the aircraft to maintain winged flight, or the at least one powered lift element experiencing a failure.

9. The control system of claim 7, further comprising:
an output device;

wherein the at least one processor is further configured to:
provide an indication to the pilot through the output device indicating that switching to the powered lift disabled mode is not permitted upon determining that the condition for switching to the powered lift disabled mode is not satisfied.

10. The control system of claim 9, wherein the indication includes the condition that was not satisfied.

11. The control system of claim 1, wherein the at least one processor is further configured to:
determine whether a condition for switching to the powered lift enabled mode is satisfied upon receiving the input indicative of the powered lift enabled mode,
wherein the condition for switching to the powered lift enabled mode includes at least one of: the at least one powered lift element is not experiencing a failure or the at least one powered lift element satisfies a battery condition.

12. The control system of claim 11, wherein the condition for switching to the powered lift enabled mode includes the at least one powered lift element satisfying the battery condition and wherein the battery condition includes a state of charge being above a threshold level.

13. The control system of claim 1, further comprising:
an output device;
wherein the at least one processor is further configured to provide an indication to the pilot through the output device indicating that switching to powered lift disabled mode is available upon determining that a condition for switching to the powered lift disabled mode is satisfied.

14. The control system of claim 13, wherein the indication includes at least one of: a displaying of text, a turning on of a light, a changing of a light color, an audible notification, or a haptic notification.

15. The control system of claim 1, further comprising:
a second pilot input device;
wherein the received input is indicative of one of the powered lift enabled mode, a powered lift intermediate mode, or the powered lift disabled mode; and
wherein the at least one processor further configured to:
control the at least one powered lift element to operate the aircraft in a selected one of the powered lift enabled mode, the powered lift intermediate mode, or the powered lift disabled mode based on the received input,
wherein in the powered lift intermediate mode, the at least one processor is configured to control the at least one powered lift element based on input received at the second pilot input device.

16. The control system of claim 15, wherein the at least one powered lift element comprises a rotor or a proprotor.

17. The control system of claim 15, wherein the first pilot input device comprises at least one of a button, a switch, a lever, a graphic user interface, a display screen, or a voice input device.

18. The control system of claim 15, wherein the state of the aircraft comprises an airspeed of the aircraft.

19. The control system of claim 18, wherein controlling the at least one powered lift element based on the state of the aircraft further comprises:
when aircraft's airspeed is above a first threshold, controlling the at least one powered lift element to operate the aircraft in the powered lift enabled mode; and
when the aircraft's airspeed is below a second threshold, controlling the at least one powered lift element to operate the aircraft in the powered lift disabled mode.

20. The control system of claim 19, wherein the second threshold is less than the first threshold.

21. The control system of claim 15, wherein when the received input is indicative of the powered lift disabled mode, the at least one processor is further configured to:
determine whether a condition for switching to the powered lift disabled mode is satisfied.

22. The control system of claim 21, wherein the condition includes at least one of an aircraft airspeed being above a threshold, the at least one powered lift element being in a stowed position, the at least one powered lift element being in a forward thrust position, the orientation of the aircraft enabling the aircraft to maintain winged flight, or the at least one powered lift element experiencing a failure.

23. The control system of claim 21, further comprising:
an output device;
wherein the at least one processor is further configured to:
provide an indication to the pilot through the output device indicating that switching to the powered lift disabled mode is not permitted upon determining that the condition for switching to the powered lift disabled mode is not satisfied.

24. The control system of claim 23, wherein the indication includes the condition that was not satisfied.

25. The control system of claim 15, wherein the at least one processor is further configured to:
determine whether a condition for switching to the powered lift enabled mode is satisfied upon receiving the input indicative of the powered lift enabled mode,
wherein the condition for switching to the powered lift enabled mode includes at least one of the at least one powered lift element is not experiencing a failure or the at least one powered lift element satisfies a battery condition.

26. The control system of claim 25, wherein the condition for switching to the powered lift enabled mode includes the at least one powered lift element satisfying the battery condition and wherein the battery condition includes a state of charge being above a threshold level.

27. The control system of claim 15, further comprising:
an output device;
wherein the at least one processor is further configured to provide an indication to the pilot through the output device indicating that switching to powered lift disabled mode is available upon determining that a condition for switching to the powered lift disabled mode is satisfied.

28. The control system of claim 15, wherein when the received input is indicative of the powered lift intermediate mode, the at least one processor is further configured to:
determine whether a condition for switching to the powered lift intermediate mode is satisfied.

29. The control system of claim 28, wherein the condition includes at least one of an aircraft airspeed being above a threshold, the at least one powered lift element being in an intermediate position, or the orientation of the aircraft enabling the aircraft to maintain winged flight in intermediate mode.

30. The control system of claim 29, further comprising:
an output device;
wherein the at least one processor is further configured to:
provide an indication to the pilot through the output device indicating that switching to the powered lift intermediate mode is not permitted upon determining that the condition for switching to the powered lift intermediate mode is not satisfied.

31. A computer-implemented method of controlling an aircraft, comprising:
- receiving, from a first pilot input device, an input indicative of one of a powered lift enabled mode or a powered lift disabled mode;
- controlling at least one powered lift element to operate the aircraft in a selected one of the powered lift enabled mode or the powered lift disabled mode based on the received input;
- when in the powered lift enabled mode, controlling the at least one powered lift element based on a state of the aircraft; and
- when in the powered lift disabled mode, controlling the at least one powered lift element to disable powered lift.

32. A computer-readable medium storing instructions which, when executed by at least one processor, cause the at least one processor to perform operations for controlling an aircraft:
- receive, from a first pilot input device, an input indicative of one of a powered lift enabled mode or a powered lift disabled mode; and
- control at least one powered lift element to operate the aircraft in a selected one of the powered lift enabled mode or the powered lift disabled mode based on the received input;
- when in the powered lift enabled mode, controlling the at least one powered lift element based on a state of the aircraft; and
- when in the powered lift disabled mode, controlling the at least one powered lift element to disable powered lift.

33. A control system for a powered lift aircraft, the system comprising at least one processor configured to:
- receive, from a first pilot input device, an input indicative of one of a powered lift enabled mode or a powered lift disabled mode; and
- control at least one powered lift element to operate the aircraft in a selected one of the powered lift enabled mode or the powered lift disabled mode based on the received input,
- wherein, in the powered lift enabled mode, the at least one processor is configured to control the at least one powered lift element based on a state of the aircraft; and
- wherein, in the powered lift disabled mode, the at least one processor is configured to control the at least one powered lift element to disable powered lift.

34. An aircraft comprising at least one processor configured to:
- receive, from a first pilot input device, an input indicative of one of a powered lift enabled mode or a powered lift disabled mode; and
- control at least one powered lift element to operate the aircraft in a selected one of the powered lift enabled mode or the powered lift disabled mode based on the received input,
- wherein, in the powered lift enabled mode, the at least one processor is configured to control the at least one powered lift element based on a state of the aircraft; and
- wherein, in the powered lift disabled mode, the at least one processor is configured to control the at least one powered lift element to disable powered lift.

* * * * *